(12) United States Patent
Narayanan Naveen et al.

(10) Patent No.: US 11,625,246 B2
(45) Date of Patent: *Apr. 11, 2023

(54) METHODS, APPARATUS, AND SYSTEMS TO REPLACE VALUES IN A DEVICE

(71) Applicant: TEXAS INSTRUMENTS INCORPORATED, Dallas, TX (US)

(72) Inventors: Ambalametil Narayanan Naveen, Kasturinagar (IN); Jasbir Singh, Kaggadaspura (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,828

(22) Filed: Aug. 12, 2021

(65) Prior Publication Data
US 2021/0373894 A1 Dec. 2, 2021

Related U.S. Application Data

(63) Continuation of application No. 16/727,598, filed on Dec. 26, 2019, now Pat. No. 11,119,775.

(51) Int. Cl.
*G06F 13/24* (2006.01)
*G06F 9/4401* (2018.01)
*G06F 9/30* (2018.01)
*G06F 9/54* (2006.01)
*G06F 9/48* (2006.01)
*G06F 9/46* (2006.01)

(52) U.S. Cl.
CPC .......... *G06F 9/30145* (2013.01); *G06F 9/466* (2013.01); *G06F 9/4812* (2013.01); *G06F 9/546* (2013.01); *G06F 13/24* (2013.01); *G06F 9/4401* (2013.01)

(58) Field of Classification Search
CPC ............................... G06F 9/4401; G06F 13/24
See application file for complete search history.

(56) References Cited

U.S. PATENT DOCUMENTS

| 11,119,775 | B2 * | 9/2021 | Narayanan Naveen ..................... G06F 9/30145 |
| 2003/0005268 | A1 | 1/2003 | Catherwood |
| 2010/0095064 | A1 | 4/2010 | Aviles |
| 2010/0223444 | A1 | 9/2010 | Glickman et al. |
| 2013/0246765 | A1 | 9/2013 | Arakawa |

(Continued)

*Primary Examiner* — Zachary K Huson
(74) *Attorney, Agent, or Firm* — Carl G. Peterson; Frank D. Cimino

(57) ABSTRACT

Methods, apparatus, and systems to replace values in a device are disclosed. An example apparatus includes a processor and a replacement generator coupled to the processor and configured to detect an access, by the processor, of a first instruction at a first address in a first memory, in response to the detected access, compare the first address to a set of trigger instruction address records in a second memory, wherein the set of trigger instruction address records includes a first trigger instruction address record that is associated with a first replacement address record and a first replacement value record, and based on the first address corresponding to the first trigger instruction address record, replace a first value at a second address in a third memory specified by the first replacement address record with a second value specified by the first replacement value record.

20 Claims, 7 Drawing Sheets

(56) References Cited

U.S. PATENT DOCUMENTS

2014/0304497 A1    10/2014   Park
2015/0149810 A1     5/2015   Packer Ali et al.
2018/0088962 A1     3/2018   Balakrishnan et al.

* cited by examiner

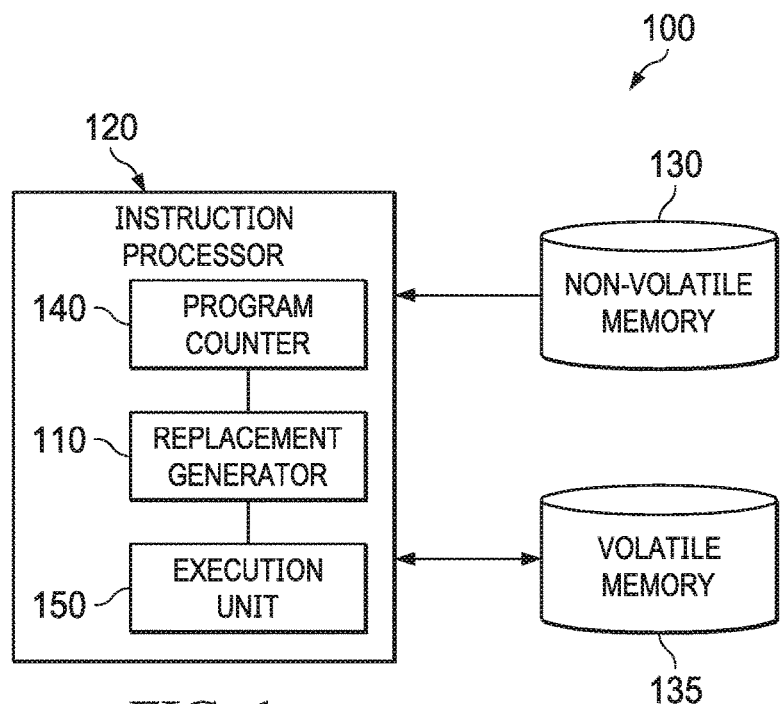
FIG. 1
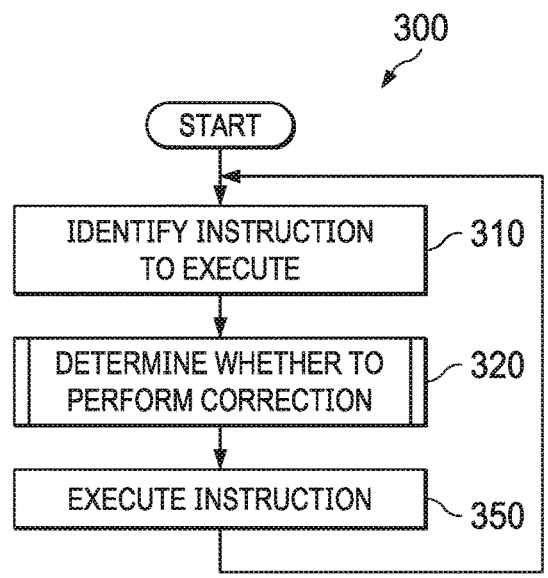
FIG. 2
FIG. 3

METHODS, APPARATUS, AND SYSTEMS TO REPLACE VALUES IN A DEVICE

This application is a continuation of U.S. application Ser. No. 16/727,598 filed Dec. 26, 2019, the entirety of which is incorporated herein by reference.

FIELD OF THE DISCLOSURE

This disclosure relates generally to electronic devices, and, more particularly, methods, apparatus, and systems to replace values in a device.

BACKGROUND

Many devices use sequences of bootloader instructions. Bootloader instructions may be used in applications to provide initialization instructions for a device such as configuration values, instructions to initialize peripheral equipment, or instructions to load additional instructions from another memory. Bootloader instructions may access values stored in a memory such as a processor register. For example, a first instruction may store a first value in a memory, and a second instruction may store a second value in a memory. The bootloader instructions may then access the first value, access the second value, and generate a third value by adding the first value to the second value. A third instruction may then store the third value in the memory and/or provide the third value to a peripheral electronic device. In some applications, bootloader instructions may be executed after a device is powered on.

BRIEF DESCRIPTION OF THE DRAWINGS

FIG. 1 is a block diagram illustrating an example environment of use including an example replacement generator to correct values in a memory.

FIG. 2 is an example instruction data table representing example instructions stored at example addresses located in a memory.

FIG. 3 is a flowchart representative of machine-readable instructions which may be executed to implement an example instruction processor.

FIG. 8 is an example memory data table representing example values stored at example addresses located in a memory to be corrected by an example replacement generator.

FIG. 11 is an example memory data table representing example values stored at example addresses located in a memory to be corrected by an example replacement generator.

DETAILED DESCRIPTION

Figure 4:
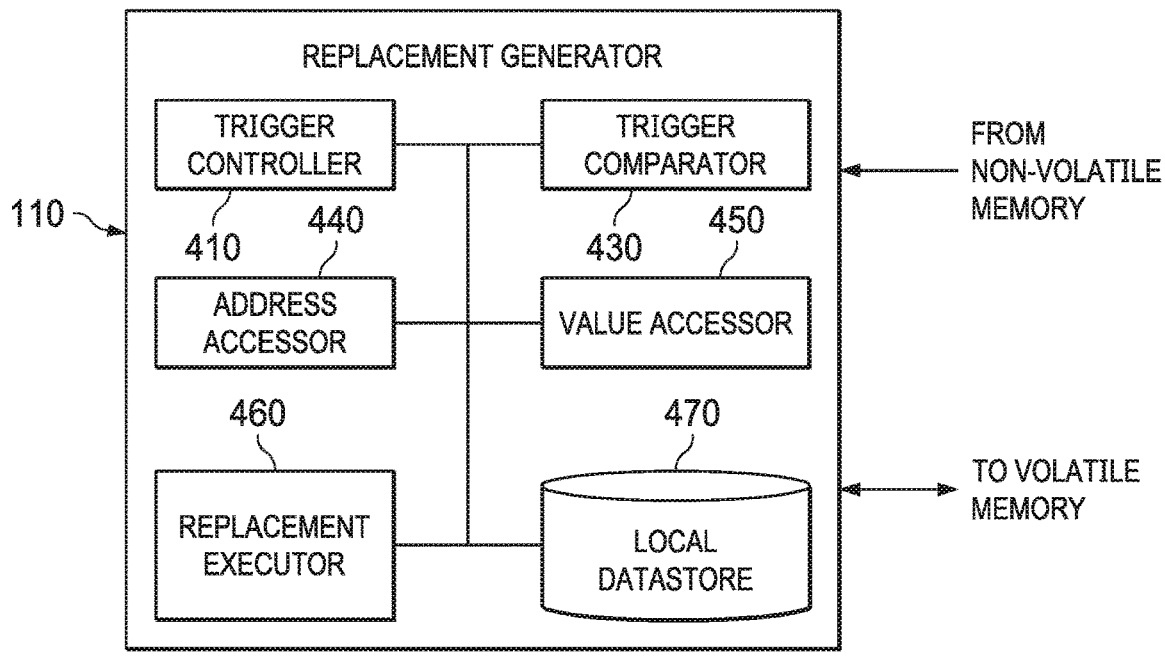
FIG. 4 is a block diagram of an example replacement generator to correct values in memory.

The drawings are not to scale. Generally, the same reference numbers in the drawings and this description refer to the same or like parts. Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

On start-up or power on of a device, the device may require an application of configuration settings and/or the execution of instructions to initialize (e.g., configure) device functionality. For example, a device may include an accelerometer to track acceleration of the device, and the accelerometer may require a configuration command (such as a sensor sensitivity setting) to be provided to the accelerometer when the accelerometer powers on. The instructions may first store a value of the configuration command to a memory such as a processor register, then load the value from the memory, and then provide the value to the accelerometer.

Bootloader instructions may include machine-readable instructions that are executed at the startup of a device. In some applications, bootloader instructions may instruct a device to transmit instructions and/or configuration commands to connected devices via an interconnect bus. For example, a device may send a command to the accelerometer instructing the accelerometer to enter a low power mode. In other applications, bootloader instructions may include machine-readable instructions to initialize components of the machine, such as initialization procedures for an operating system. Bootloader instructions may be stored in non-volatile memory such as read-only memory (ROM), and bootloader instruction sequences stored in ROM may not be modified.

Bootloader instructions may access and/or modify configuration values. For example, the command to instruct the accelerometer to enter a low power mode may be stored at an address in a memory. Configuration values for bootloader instructions may be stored in a memory separate from the non-volatile memory storing the bootloader instructions, such as a processor register, random-access memory, or a hard drive. For example, bootloader instructions may be stored in non-volatile memory, and the bootloader instructions include sending a command to the accelerometer. The value of the command to be sent may be stored in a second memory, the second memory a volatile memory, and the bootloader instructions may include a first instruction to access the command value in the volatile memory and a second instruction to provide the command value to the accelerometer.

During the lifetime of a device, replacements (e.g., corrections) to the bootloader process may be beneficial. In some examples, values used in the bootloading process may be replaced (e.g., corrected). For example, if a first accelerometer is replaced with a second accelerometer, and the second accelerometer requires an initialization command value different from the initialization command value of the first accelerometer, a correction may be applied to the bootloader process to enable functionality of the second accelerometer. Because bootloader instructions stored in ROM may not be modified, changes to the bootloader instructions may be costly in hardware revisions. In some cases, where a correction of the bootloader process is not available, the device may lose functionality. In other cases, a hardware revision may increase overhead to support features of the device.

However, an instruction processor executing a bootloader process may include a replacement generator in order to replace values (e.g., correct an initialization command value) that are stored and/or accessed during the bootloader process. For example, a bootloader process may include a first instruction to access an initialization command value from a first address in a volatile memory and a second instruction to provide the initialization command value to a device. The first instruction may be located at a second address in a non-volatile memory, and the second instruction may be located at a third address in the non-volatile memory. An instruction processor may identify the first instruction as an instruction to be executed. Prior to executing the first instruction, a replacement generator may determine whether to perform a replacement of a value stored in a volatile memory. The replacement generator may determine whether to perform a replacement by accessing a trigger instruction address, determining the address at which the first instruction is located (such as from a program counter), and determining whether the trigger instruction address matches (e.g., equals, points to, corresponds to) the address of the first instruction. To perform the replacement of the initialization command value, the replacement generator may access a trigger replacement address (e.g., a pointer to the location of the initialization command value) and a trigger value (e.g., a replacement initialization command value). The replacement generator may replace the initialization command value (e.g., the value pointed to by the trigger replacement address) with the trigger value.

After the replacement generator replaces the initialization command value with the trigger value, an execution unit included in the instruction processor may execute the first instruction. Because the initialization command value was corrected prior to the execution of the first instruction, the bootloader process accesses the updated value of the initialization command value (e.g., the trigger value) and executes further instructions based on the updated value. For example, the execution unit may execute the second instruction to provide the updated initialization command value to a peripheral device.

As used herein, the phrases "correction," "to correct," and "to update," including variations thereof, encompass a replacement of a value stored at an address with a new value. For example, a correction may include a replacement of a value (such as an initialization command value of 30) at an address (such as an address of 93 located in volatile memory) with a replacement value (such as an initialization command value of 32). In some examples described herein, the trigger replacement addresses and trigger values used in the correction process are stored in a third memory separate from the second memory storing the values to be corrected. However, any other method to store to the addresses and values used in the correction process may additionally or alternatively be used. For example, the addresses and values used in the correction process may be stored in the second memory storing the values to be corrected. Further, the examples discussed herein are not limited to the replacement of values stored at an address. For example, additional and/or alternate instructions may be executed during a replacement process to replace a value.

In some examples, a bootloader process may include instructions to read values stored in a memory via an interconnect bus. Before an instruction processor accesses a value stored in the memory, a replacement generator may provide an interrupt request to the instruction processor. Responsive to obtaining the interrupt request, the instruction processor may replace the value to be accessed, and then the instruction processor may access the replaced value in the memory. For example, the bootloader process may include an instruction to access a value (such as an initialization command value) stored at an address in a memory. To access the value, the instruction processor may provide a transaction to the memory, the transaction including a transaction address pointing to the address of the value. A replacement generator may determine whether to perform a replacement of the value. The replacement generator may determine whether to perform a replacement by accessing a trigger transaction address, accessing the transaction address, and determining whether the trigger transaction address matches the transaction address. The replacement generator may provide an interrupt request to the instruction processor. The instruction processor accesses a trigger replacement address (e.g., a pointer to the location of the value to be replaced) and a trigger value (e.g., a replacement value). The instruction processor (e.g., an execution unit) provides a transaction on the interconnect bus to update the value pointed to by the trigger replacement address with the trigger value. The instruction processor may then access the updated value by providing a second transaction to the memory via the interconnect bus.

FIG. 1 is a block diagram illustrating an example environment 100 of use including an example replacement generator 110 to correct values in a memory. The environment 100 of FIG. 1 includes an example instruction processor 120, an example non-volatile memory 130, and an example volatile memory 135. The instruction processor 120 includes the replacement generator 110, an example program counter 140, and an example execution unit 150.

The program counter 140 identifies an instruction to be executed. In examples described herein, the program counter 140 identifies an instruction to be executed by incrementing a value in a register indicating an address at which an instruction is located, such as a counter or a pointer. For example, a first instruction may be located at a first address (such as an address of 4 in the non-volatile memory 130) and a second instruction may be located at a second address (such as an address of 5 in the non-volatile memory 130). The program counter 140 may identify that the first instruction is to be executed. After an execution of the first instruction, the program counter 140 may increment the value in the register (e.g., the register value is incremented from 4 to 5), and the program counter 140 may indicate that the second instruction is to be executed. However, any other methods to determine the next instruction to be executed may additionally and/or alternatively be used.

For example, a first instruction may be located at a first address (such as an address of 4 in the non-volatile memory 130), a second instruction may be located at a second address (such as an address of 5 in the non-volatile memory 130), and a third instruction may be located at a third address (such as an address of 10 in the non-volatile memory 130). The program counter 140 may identify the first instruction as the instruction to be executed. Prior to execution of the first instruction, the program counter 140 may increment the value of the register (e.g., the register value is incremented from 4 to 5), and then an execution of the first instruction may update the value in the register (e.g., the register value is incremented from 5 to 10 in a jump instruction). The program counter 140 may then indicate that the third instruction is the instruction to be executed rather than the second instruction.

The program counter 140 of the illustrated example of FIG. 1 is implemented by a logic circuit such as, for example, a hardware processor. However, any other type of circuitry may additionally or alternatively be used such as, for example, one or more analog or digital circuits, logic circuits, programmable processors, application specific integrated circuits (ASICs), programmable logic devices (PLDs), field programmable logic devices (FPLDs), digital signal processors (DSPs), graphics processing units (GPUs), etc.

The replacement generator 110 determines whether a replacement (e.g., a correction) should be performed. If the replacement generator 110 determines that a correction should be performed, the replacement generator 110 performs the replacement (e.g., the correction). In some examples, the determining whether a correction should be performed includes identifying whether a trigger instruction address record corresponds to an instruction address. A trigger instruction address record may include a trigger instruction address, and the replacement generator 110 may determine whether the trigger instruction address matches an address of an instruction to be executed. For example, the program counter 140 may identify an instruction to be executed, the instruction located at an address in the non-volatile memory 130. The replacement generator 110 may determine whether a trigger instruction address included in a trigger instruction address record matches, or is equal to, the address of the instruction.

The instruction address is an address at which an instruction identified by the program counter 140 is stored. The replacement generator 110 determines whether a trigger instruction address associated with the trigger instruction address record corresponds to the instruction address. However, any other methods to determine whether a correction should be performed may additionally and/or alternatively be used. In some examples, the replacement generator 110 may determine whether a replacement should be performed by accessing a transaction on an interconnect bus, the transaction including a transaction address, accessing a trigger transaction address, and determining whether the trigger transaction address matches the transaction address.

In examples described herein, when a correction is performed, the replacement generator 110 accesses an address at which a value is located (e.g., a trigger replacement address), accesses a correction value (e.g., a trigger value), and replaces the value with the correction value. In other words, the replacement generator 110 replaces a value at an address in a memory with a correction value. The value at the first address may be located in a first memory (e.g., the volatile memory 135), and the correction value may be located in a second memory different from the first memory (e.g., a memory included in the replacement generator 110). Any other method to perform a correction may additionally and/or alternatively be used. For example, the replacement generator 110 may provide at least one instruction for the execution unit 150 to execute. In another example, the replacement generator 110 replaces multiple values stored in the volatile memory 135 with multiple correction values. In another example, the replacement generator 110 may provide an interrupt request to the program counter 140 and/or the execution unit 150, and the instruction processor 120 may access a trigger replacement address and a trigger value and then replace a value stored at the trigger replacement address with the trigger value. In some examples, the replacement generator 110 may be configured to replace a value stored in the volatile memory 135 by issuing an interrupt to a processor configured to store the replacement value at an address specified by a replacement value record. The replacement generator 110 may cause the processor to store the replacement value at the address specified by the replacement value record by issuing an interrupt (e.g., by providing an interrupt request).

The replacement generator 110 of the illustrated example of FIG. 1 is implemented by a logic circuit such as, for example, a hardware processor. However, any other type of circuitry may additionally or alternatively be used such as, for example, one or more analog or digital circuits, logic circuits, programmable processors, ASICs, PLDs, FPLDs, programmable controllers, GPUs, DSPs, etc.

The execution unit 150 executes the instruction identified by the program counter 140. In examples described herein, the execution unit 150 executes at least one instruction identified by the program counter 140. However, the execution unit 150 may execute more than the at least one instruction identified by the program counter 140. For example, the execution unit 150 may execute a first instruction identified by the program counter 140, then the execution unit 150 may execute a second instruction not identified by the program counter 140.

The execution unit 150 of the illustrated example of FIG. 1 is implemented by a logic circuit such as, for example, a hardware processor. However, any other type of circuitry may additionally or alternatively be used such as, for example, one or more analog or digital circuits, logic circuits, programmable processors, ASICs, PLDs, FPLDs, programmable controllers, GPUs, DSPs, etc.

The non-volatile memory 130 of the illustrated example of FIG. 1 is implemented by any memory, storage device and/or storage disc for storing data such as, for example, eFuses, flash memory, magnetic media, optical media, solid state memory, hard drives, thumb drives, etc. Furthermore, the data stored in the non-volatile memory 130 may be in any data format such as, for example, binary data, comma delimited data, tab delimited data, structured query language (SQL) structures, etc. While, in the illustrated example, the non-volatile memory 130 is illustrated as a single device, the non-volatile memory 130 and/or any other data storage devices described herein may be implemented by any number and/or types of memories. In the illustrated example of FIG. 1, the non-volatile memory 130 stores instructions to be processed by the instruction processor 120. Instructions may be stored in the non-volatile memory 130 at the time of device assembly.

The volatile memory 135 of the illustrated example of FIG. 1 is implemented by any memory, storage device and/or storage disc for storing data such as, for example, eFuses, flash memory, magnetic media, optical media, solid state memory, hard drives, thumb drives, etc. Furthermore, the data stored in the volatile memory 135 may be in any data format such as, for example, binary data, comma delimited data, tab delimited data, structured query language (SQL) structures, etc. While, in the illustrated example, the volatile memory 135 is illustrated as a single device, the volatile memory 135 described herein may be implemented by any number and/or types of memories. In the illustrated example of FIG. 1, the volatile memory 135 stores values that the replacement generator 110 may replace with correction values. In some examples, the volatile memory 135 may store trigger instruction addresses, trigger transaction addresses, trigger replacement addresses, and/or trigger values. In some examples, the volatile memory 135 may include RAM, a storage device such as a hard drive or a solid-state drive, a central processing unit cache, one or more processor registers, etc.

Figures 6, 7:
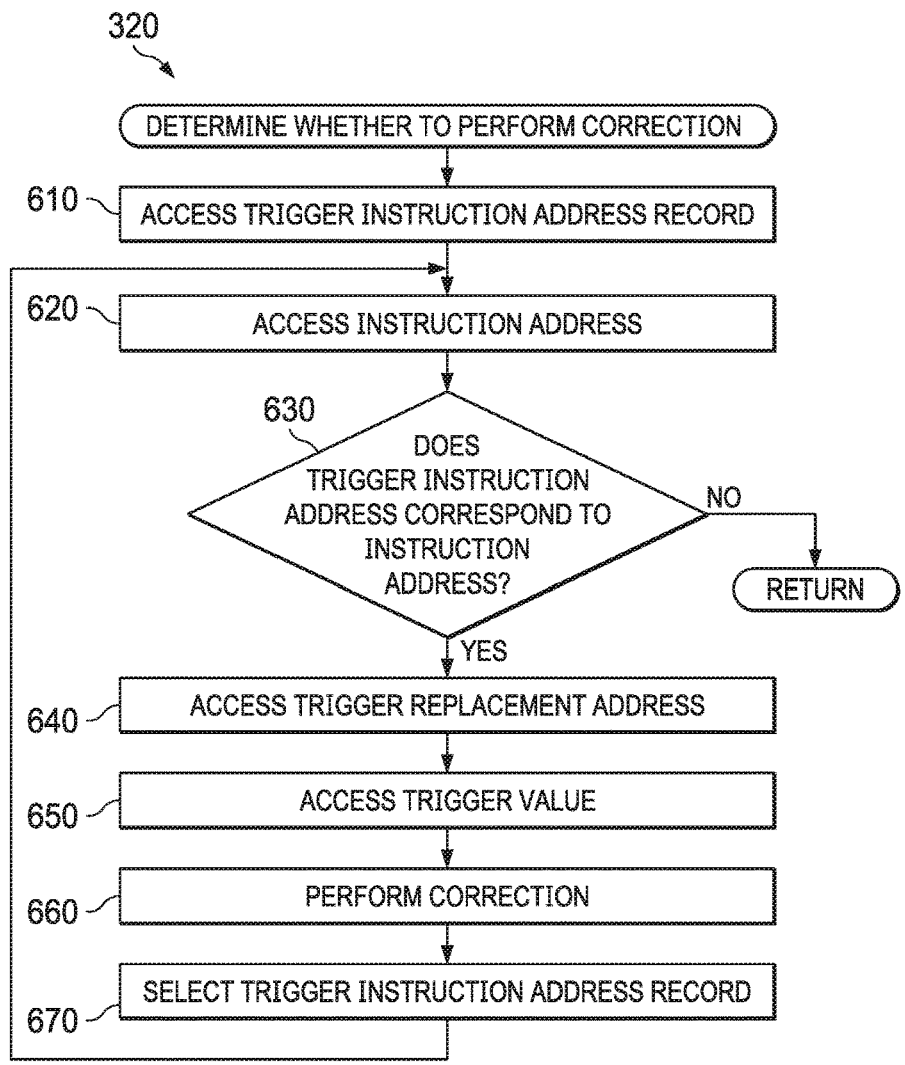
FIG. 6 is a flowchart representative of machine-readable instructions which may be executed to implement an example replacement generator.
FIG. 7 is an example portion of a code block representative of the machine-readable instructions illustrated in FIG. 6 which may be executed to implement an example replacement generator.

While an example manner of implementing the instruction processor 120 of FIG. 1 is illustrated in FIGS. 3, 6, and/or 10, one or more of the elements, processes and/or devices illustrated in FIGS. 3, 6, and/or 10 may be combined, divided, re-arranged, omitted, eliminated and/or implemented in any other way. Further, the example program counter 140, the example execution unit 150, the example replacement generator 110 and, more generally, the example instruction processor 120 of FIG. 1 may be implemented by hardware, software, firmware and/or any combination of hardware, software and/or firmware. Thus, for example, any of the example program counter 140, the example execution unit 150, the example replacement generator 110 and, more generally, the example instruction processor 120 could be implemented by one or more analog or digital circuits, logic circuits, programmable processors, programmable controllers, graphics processing units (GPUs), digital signal processors (DSPs), application specific integrated circuits (ASICs), programmable logic devices (PLDs) and/or field programmable logic devices (FPLDs). When reading any of the apparatus or system claims of this patent to cover a purely software and/or firmware implementation, at least one of the example program counter 140, the example execution unit 150, and/or the example replacement generator 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example instruction processor 120 of FIG. 1 may include one or more elements, processes and/or devices in addition to, or instead of, those illustrated in FIGS. 3, 6, and/or 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 2 is an example instruction data table 200 representing example instructions 210 stored at example addresses 215 located in a memory (e.g., the non-volatile memory 130). The instruction data table 200 includes the addresses 215 (e.g., an address to a location in the non-volatile memory 130) and the instructions 210 (e.g., an instruction stored in the non-volatile memory 130). The addresses 215 indicate addresses at which the instructions 210 are stored in a memory (e.g., the non-volatile memory 130).

In examples discussed herein, an instruction is a machine readable instruction (such as an opcode, machine code, or an operation in a compiled computer program), and the execution unit 150 executes the instructions 210 to ensure device functionality. For example, an electronic device may execute the instructions 210 to access an acceleration value from an accelerometer. In another example, an electronic device may execute the instructions 210 to provide data requested by another device on an interconnect bus. In some examples, the instructions 210 may be compiled from a computer program written in a language such as C, C++, assembly language, Swift, etc. The instructions 210 may be generated (e.g., compiled) and stored in a memory (e.g., the non-volatile memory 130) prior to device assembly. However, the instructions 210 may be stored in any additional and/or alternative memory. The instructions 210 may be generated and/or stored in a memory during and/or after device assembly.

In the example illustrated in FIG. 2, six instruction rows are shown. Each instruction row represents an instruction to be executed by the execution unit 150 and an address at which the instruction is located (e.g., in the non-volatile memory 130). A first instruction row 216 represents an instruction of 44 stored at an address of 0. A second instruction row 218 represents an instruction of 55 stored at an address of 1. A third instruction row 220 represents an instruction of 3 stored at an address of 2. A fourth instruction row 230 represents an instruction of 55 stored at an address of 3. A fifth instruction row 240 represents an instruction of 80 stored at an address of 4. A sixth instruction row 250 represents an instruction of 82 stored at an address of 5.

The address included in each of the instruction rows 216, 218, 220, 230, 240, 250 indicate an address in a memory at which the instruction is stored. For example, the first instruction row 216 represents that an instruction of 44 is stored at an address of 0 in the non-volatile memory 130. Similarly, the second instruction row indicates that an instruction of 80 is stored at an address of 4. In examples discussed herein, the instructions 210 are located in the non-volatile memory 130. For example, the instruction of 44 included in the first instruction row 216 is stored at an address of 0, and the address of 0 is located in the non-volatile memory 130. However, the instructions 210 to be processed by the instruction processor 120 may be stored in any suitable memory, such as the volatile memory 135. While in the illustrated example of FIG. 2 the instructions 210 are represented as two-digit integers, the instructions may additionally and/or alternatively include any other form. For example, an instruction may include additional information, such as additional machine-readable instructions, parameters for the instructions, etc. In another example, an instruction may be represented as two 32-bit integers.

While six instruction rows are shown in the illustrated example of FIG. 2, any other number of rows may be included in the instruction data table 200. For example, the non-volatile memory 130 may store ten thousand instructions, and the instruction data table 200 may include ten thousand rows to represent the instructions. While in the example illustrated in FIG. 2 the addresses 215 and the instructions 210 are represented as two-digit integers, the addresses 215 and the instructions 210 may be formatted in any other way. For example, the instructions 210 may be formatted as 64-bit integers.

A flowchart representative of example hardware logic, machine readable instructions, hardware implemented state machines, and/or any combination thereof for implementing the instruction processor 120 of FIG. 1 is shown in FIGS. 3, 6, and/or 10. The machine readable instructions may be one or more executable programs or portions of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 3, many other methods of implementing the example instruction processor 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding programs can be executed in whole or in part. Thus, the disclosed machine readable instructions and/or corresponding programs are intended to encompass such machine readable instructions and/or programs regardless of the particular format or state of the machine readable instructions and/or programs when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 6, and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine-readable instructions 300 which may be executed to implement an example instruction processor (e.g., the instruction processor 120 of FIG. 1). The program counter 140 identifies an instruction to be executed. (Block 310). In some examples described herein, the program counter 140 identifies an instruction to be executed by incrementing a counter indicating the address at which the instruction is stored in the non-volatile memory 130. For example, if an instruction previously identified to be executed is located at an address of 0, then the program counter 140 may determine that the instruction to be executed is located at an address of 1. However, any other methods to determine an instruction to be executed may additionally and/or alternatively be used. For example, if the previous instruction is located at an address of 5, then the program counter 140 may determine that the instruction to be executed is located at an address of 3. In some examples, instructions to be executed may be stored at addresses located in memories separate from the non-volatile memory 130. For example, an instruction may be stored in the volatile memory 135. In some examples, the program counter 140 may identify an instruction to be executed using an instruction previously identified to be executed. For example, an instruction of 55 may include a command to execute instructions at another location, such as a branch instruction or a jump instruction.

The replacement generator 110 determines whether a correction should be performed. (Block 320). If the replacement generator 110 determines that a correction should be performed, the replacement generator 110 performs the correction. For example, the replacement generator 110 may replace a value stored in the volatile memory 135 with a replacement value. In another example, the replacement generator 110 may provide an interrupt request to the instruction processor 120. Responsive to the interrupt request, the execution unit 150 may execute at least one instruction to replace a value with a replacement value. In some examples, determining whether a correction should be performed includes identifying whether a trigger instruction address matches an instruction address. The instruction address is an address at which an instruction identified by the program counter 140 is located. In some examples, determining whether a correction should be performed includes identifying whether a trigger transaction address matches a transaction address included in a transaction on an interconnect bus. Further details regarding trigger instruction addresses and trigger transaction addresses are discussed below in connection with FIG. 5. Any other methods to determine whether a correction should be performed may additionally and/or alternatively be used. For example, the replacement generator 110 may determine whether an instruction, such as an instruction of 55, matches a trigger instruction address, such as a trigger instruction address of 55.

The execution unit 150 executes the instruction identified by the program counter 140. (Block 350). In examples described herein, the execution unit 150 executes an individual instruction identified by the program counter 140. However, the execution unit 150 may execute more than the instruction identified by the program counter 140. For example, the execution unit 150 may execute a first instruction identified by the program counter 140, then the execution unit 150 may execute a second instruction, the second instruction not identified by the program counter 140 and located in the non-volatile memory 130.

In examples described herein, the instruction processor 120 first identifies an instruction to execute, determines whether to perform a correction, performs the correction, and then executes the identified instruction. However, the instruction processor can identify an instruction, determine whether to perform a correction, perform the correction, and/or execute the identified instruction in any order. For example, the instruction processor 120 may first identify an instruction to be executed, execute the identified instruction, determine whether to perform a correction, and then perform the correction. In other examples, the instruction processor may identify an instruction, determine whether to perform a correction, perform the correction, and/or execute the identified instruction in parallel processes, wherein the processes are being performed simultaneously.

FIG. 4 is a block diagram of an example replacement generator (e.g., the replacement generator 110 of FIG. 1) to correct values stored in a memory (e.g., the volatile memory 135). The replacement generator 110 includes an example trigger controller 410, an example trigger comparator 430, an example address accessor 440, an example value accessor 450, an example replacement executor 460, and an example local datastore 470.

The example replacement generator 110 of FIGS. 1 and/or 4 is not limited to the instruction processor 120 of FIG. 1. The replacement generator 110 may be used to replace (e.g., correct) values in components not limited to the non-volatile memory 130 and/or the volatile memory 135. For example, the replacement generator 110 may correct the operation of non-memory components in the environment 100, such as an accelerometer, a sensor, a transducer, or any other suitable device that may be connected to the instruction processor 120. Further, the replacement generator 110 may indicate to the instruction processor 120 alternative instructions to be identified by the program counter 140 and/or executed by the execution unit 150 to execute a correction by providing an interrupt request.

The trigger controller 410 accesses a trigger instruction address record. In examples described herein, a trigger instruction address record is associated with an instruction address. For example, an instruction may be stored at an address in the non-volatile memory 130, and an associated trigger instruction address record may include a trigger instruction address pointing to, and/or having the same value as, the address of the instruction. In some examples, the trigger controller 410 may access a trigger transaction address record. A trigger transaction address record is associated with a transaction provided on an interconnect bus. For example, a transaction may include a transaction address pointing to a value stored in the volatile memory 135, and an associated trigger transaction address record may include a trigger transaction address pointing to, and/or having the same value as, the transaction address. The trigger controller 410 of the illustrated example of FIG. 4 is implemented by a logic circuit such as, for example, a hardware processor. However, any other type of circuitry may additionally or alternatively be used such as, for example, one or more analog or digital circuits, logic circuits, programmable processors, ASICs, PLDs, FPLDs, programmable controllers, GPUs, DSPs, etc.

The trigger comparator 430 accesses an instruction address identified by the program counter 140. The trigger comparator 430 determines whether a correction should be performed. In examples described herein, the trigger comparator 430 determines whether a correction should be performed by comparing the trigger instruction address included in the trigger instruction address record to the instruction address. An example implementation of the storage of trigger instruction address records, trigger replacement address records, and trigger value records is described below in connection with FIG. 5. However, other methods to compare the trigger instruction address record to an instruction may additionally and/or alternatively be used. In some examples, the trigger comparator 430 determines whether a replacement should be performed by comparing the trigger transaction address included in the trigger transaction address record to the transaction address included in a transaction. The trigger comparator 430 of the illustrated example of FIG. 4 is implemented by a logic circuit such as, for example, a hardware processor. However, any other type of circuitry may additionally or alternatively be used such as, for example, one or more analog or digital circuits, logic circuits, programmable processors, ASICs, PLDs, FPLDs, programmable controllers, GPUs, DSPs, etc.

The address accessor 440 accesses a trigger replacement address. If the trigger comparator 430 determines that the trigger instruction address corresponds to the instruction address identified by the program counter 140, the address accessor 440 accesses a trigger replacement address corresponding to the trigger instruction address record. In examples disclosed herein, the trigger replacement address corresponds to, or points to, a value stored in the volatile memory 135 to be replaced by the replacement generator 110. For example, a trigger replacement address of 44 may indicate that a value to be replaced is stored at an address of 44 located in the volatile memory 135. In some examples, the address accessor 440 may access a trigger replacement address that corresponds to a trigger transaction address record accessed by the trigger controller 410. The address accessor 440 of the illustrated example of FIG. 4 is implemented by a logic circuit such as, for example, a hardware processor. However, any other type of circuitry may additionally or alternatively be used such as, for example, one or more analog or digital circuits, logic circuits, programmable processors, ASICs, PLDs, FPLDs, programmable controllers, GPUs, DSPs, etc.

The value accessor 450 accesses a trigger value corresponding to the trigger instruction address record. If the trigger comparator 430 determines that the trigger instruction address corresponds to an instruction address identified by the program counter 140, the value accessor 450 accesses a trigger replacement address corresponding to the trigger instruction address record. In some examples, the value accessor 450 may access a trigger replacement address that corresponds to a trigger transaction address record accessed by the trigger controller 410. The value accessor 450 of the illustrated example of FIG. 4 is implemented by a logic circuit such as, for example, a hardware processor. However, any other type of circuitry may additionally or alternatively be used such as, for example, one or more analog or digital circuits, logic circuits, programmable processors, ASICs, PLDs, FPLDs, programmable controllers, GPUs, DSPs, etc.

The replacement executor 460 replaces (e.g., corrects) a value stored at an address in memory. The replacement executor 460 corrects a value stored at (e.g., pointed to by) a trigger replacement address with a trigger value. In examples described herein, the trigger replacement address is accessed by the address accessor 440, and the trigger value is accessed by the value accessor 450. An example memory data table reflecting values corrected by the replacement executor 460 is described below in connection with FIG. 8. In some examples, the replacement generator 110 may provide an interrupt request to the instruction processor 120. The instruction processor 120 may access the interrupt request and replace a value stored at an address pointed to by the trigger replacement address with the trigger value. The replacement executor 460 of the illustrated example of FIG. 4 is implemented by a logic circuit such as, for example, a hardware processor. However, any other type of circuitry may additionally or alternatively be used such as, for example, one or more analog or digital circuits, logic circuits, programmable processors, ASICs, PLDs, FPLDs, programmable controllers, GPUs, DSPs, etc.

The example local datastore 470 of the illustrated example of FIG. 4 is implemented by any memory, storage device and/or storage disc for storing data such as, for example, eFuses, flash memory, magnetic media, optical media, solid state memory, hard drives, thumb drives, etc. Furthermore, the data stored in the example local datastore 470 may be in any data format such as, for example, binary data, comma delimited data, tab delimited data, structured query language (SQL) structures, etc. While, in the illustrated example, the example local datastore 470 is illustrated as a single device, the example local datastore 470 and/or any other data storage devices described herein may be implemented by any number and/or types of memories. For example, the local datastore 470 may be implemented by one or more eFuses. In the illustrated example of FIG. 4, the example local datastore 470 stores trigger instruction address records, trigger transaction address records, trigger replacement address records, and trigger value records. An example diagram illustrating an example implementation of the local datastore 470 is described below in connection with FIG. 5. In some examples, trigger instruction address records, trigger transaction address records, trigger replacement address records, and/or trigger value records may be stored in the volatile memory 135. In some examples, the local datastore 470 may be included in and/or implemented by the volatile memory 135.

Figure 5:
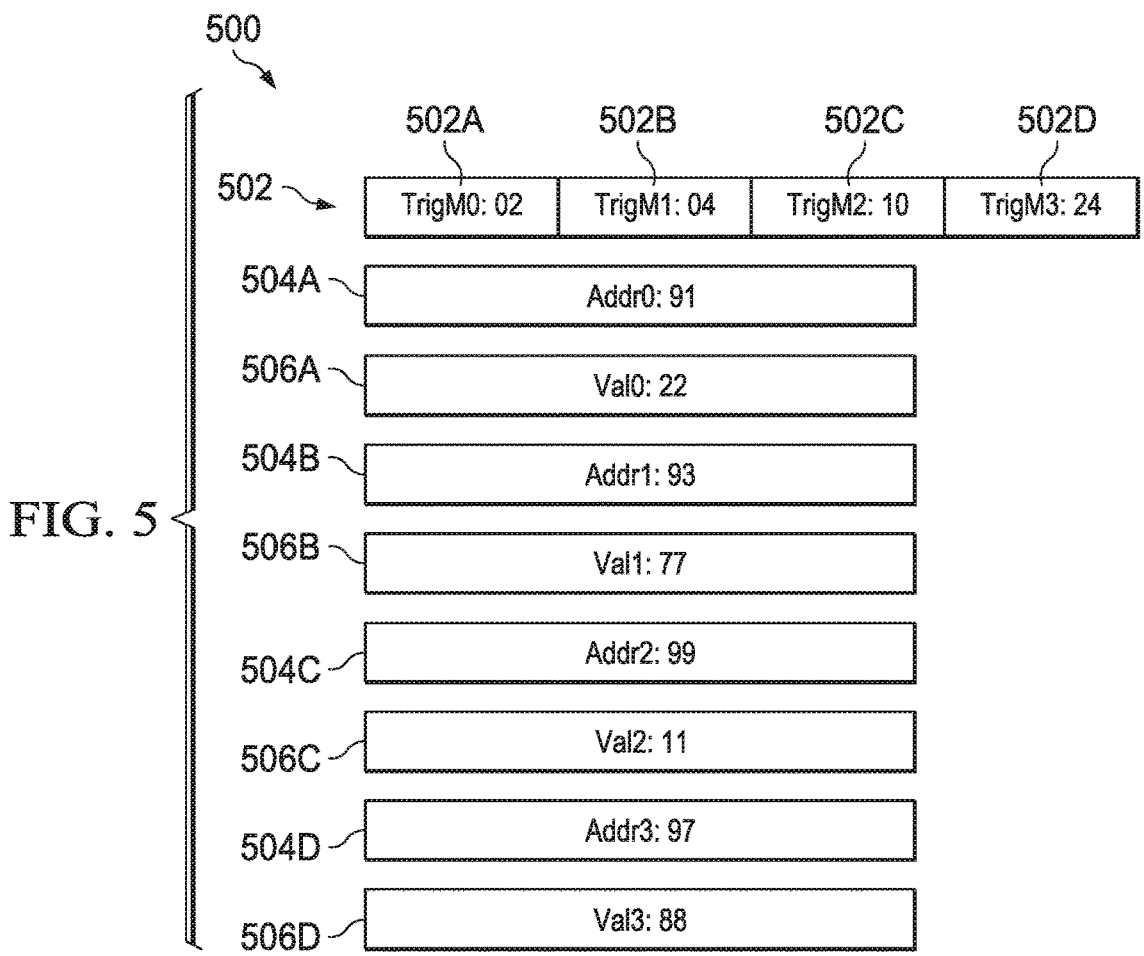
FIG. 5 is a diagram illustrating an example trigger data table including example trigger instruction address records, example trigger replacement address records, and example trigger value records.

FIG. 5 is a diagram illustrating an example trigger data table 500 including example trigger instruction address records 502, example trigger replacement address records 504, and example trigger value records 506. The trigger instruction address records 502, the trigger replacement address records 504, and the trigger value records 506 are accessed by the replacement generator 110 to determine whether a replacement is to be executed, an address at which a value is to be replaced, and/or a replacement value to update a value when the replacement is executed. In examples discussed herein, the trigger instruction address records 502, the trigger replacement address record 504, and the trigger value records 506 are included (e.g., stored) in the local datastore 470. However, any of the trigger instruction address records 502, the trigger replacement address records 504, or the trigger value records 506 are included in the local datastore 470 may additionally and/or alternatively be included in any other datastore or memory. For example, a first trigger replacement address record may be included in the volatile memory 135, and a second trigger replacement address record may be stored in the local datastore 470. In some examples, the trigger data table 500 may include trigger transaction address records.

In examples discussed herein, the trigger data table 500 is stored in the local datastore 470 of the replacement generator 110. However, any other methods to store and/or access the trigger data table 500 may additionally and/or alternatively be used. For example, the trigger data table 500 may be stored in the volatile memory 135. In another example, a first portion of the trigger data table 500 may be stored in the local datastore 470, and a second portion of the trigger data table 500 may be stored in the volatile memory 135.

A trigger instruction address record includes a trigger instruction address. A trigger instruction address may correspond to (e.g., equal, match, point to) an address at which an instruction to be executed by the execution unit 150 is stored. For example, if an instruction of 44 is stored at an address of 0 in the non-volatile memory 130, as represented by the first instruction row 216, a trigger instruction address of 0 corresponds to the address of 0. Similarly, if an instruction of 3 is stored at an address of 2 in the non-volatile memory 130, as represented by the third instruction row 220, a trigger instruction address of 2 corresponds to the address of 2. In examples discussed herein, trigger instruction address records include trigger instruction addresses that match addresses of instructions stored in the non-volatile memory 130. However, trigger instruction addresses may correspond to instructions stored in any memory, such as a register in the instruction processor 120, the volatile memory 135, etc.

In some examples, a trigger instruction address record may be a trigger transaction address record, and the trigger instruction address may be a trigger transaction address. A device (e.g., the instruction processor 120) may communicate with other devices (e.g., the volatile memory 135) by providing transactions on an interconnect bus. As used herein, the phrase "communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A transaction may include a transaction type (e.g., a read command, a write command) and a transaction address (e.g., an address of 92 located in the volatile memory 135). For example, the instruction processor 120 may provide a transaction on an interconnect bus to the volatile memory 135, the transaction including a transaction type indicating a read command and a transaction address of 92. The volatile memory 135 may respond to the transaction by providing the instruction processor 120 with a value located at the address of 92. A trigger transaction address may correspond to (e.g., equal, match, point to) an address included in a transaction (e.g., a transaction address). For example, if a transaction on an interconnect bus includes a transaction type indicating a read command and a transaction address of 95, a trigger transaction address of 95 corresponds to the address of 95. The address of 95 may be located in the volatile memory 135.

A trigger replacement address record includes a trigger replacement address. A trigger replacement address may correspond to (e.g., equal, match, point to) an address at which a value is to be replaced (e.g., corrected). In some examples, a trigger replacement address is a pointer to a value to be replaced and stored in a memory. For example, if an address of 3 is located in the volatile memory 135, a trigger replacement address of 3 points to the address of 3. In example discussed herein, trigger replacement address records include trigger replacement addresses that match addresses of values stored in the volatile memory 135 that are to be replaced by the replacement generator 110. However, trigger replacement addresses may correspond to (e.g., point to) values stored in any memory, such as a second volatile memory or registers included in the instruction processor 120.

A trigger value record includes a trigger value. A trigger value is a value to replace another value stored at an address indicated by a trigger replacement address. For example, if a value of 0 is stored in the volatile memory 135, a trigger value of 22 indicates that the replacement generator 110 is to replace the value of 0 with the trigger value of 22. In another example, if a value of 34 is stored at an address of 93 located in the volatile memory 135, a trigger replacement address record includes a trigger replacement address of 93, and a trigger value record associated with the trigger replacement address record includes a trigger value of 77, then the replacement generator 110 may replace the value of 34 stored at the address of 93 with the trigger value of 77. Further, if a trigger instruction address record associated with the trigger replacement address record and the trigger value record includes a trigger instruction address of 4, the replacement generator 110 may replace the value of 34 with the trigger value of 77 when an address of an instruction identified by the program counter 140 matches the trigger instruction address of 4. A trigger instruction address record, a trigger transaction address record, a trigger replacement address record, and/or a trigger value record may be associated with each other via identifiers, as discussed below.

In the illustrated example, four trigger instruction address records, four trigger replacement address records, and four trigger value records are shown. A first example trigger instruction address record 502A includes an identifier of "TrigM0" and a first trigger instruction address of 2. A second example trigger instruction address record 502B includes an identifier of "TrigM1" and a second trigger instruction address of 4. A third example trigger instruction address record 502C includes an identifier of "TrigM2" and a third trigger instruction address of 10. A fourth example trigger instruction address record 502D includes an identifier of "TrigM3" and a fourth trigger instruction address of 24.

A first example trigger replacement address record 504A includes an identifier of "Addr0" and a first trigger replacement address of 91. A second example trigger replacement address record 504B includes an identifier of "Addr1" and a second trigger replacement address of 93. A third example trigger replacement address record 504C includes an identifier of "Addr2" and a third trigger replacement address of 99. A fourth example trigger replacement address record 504D includes an identifier of "Addr3" and a fourth trigger replacement address of 97.

A first example trigger value record 506A includes an identifier of "Val0" and a first trigger value of 22. A second example trigger value record 506B includes an identifier of "Val1" and a second trigger value of 77. A third example trigger value record 506C includes an identifier of "Val2" and a third trigger value of 11. A fourth example trigger value record 506D includes an identifier of "Val3" and a fourth trigger value of 88.

While in the illustrated example of FIG. 5, four trigger instruction address records, four trigger replacement address records, and four trigger value records are shown, any other number of trigger instruction address records, trigger transaction address records, trigger replacement address records, and/or trigger value records may additionally and/or alternatively be used. For example, the local datastore 470 may store two thousand trigger instruction address records, two thousand trigger replacement address records, and two thousand trigger value records. In another example, the trigger data table 500 may include three trigger transaction address records.

In the illustrated example of FIG. 5, each trigger instruction address record is associated with a trigger replacement address record and a trigger instruction record based on identifiers included in the trigger instruction address record, the trigger replacement address record, and the trigger instruction record. In examples disclosed herein, the records are associated via the last character in the identifiers. For example, the identifier "TrigM0" included in the first trigger instruction address record 502A, the identifier "Val0" included in the first trigger replacement address record 504A, and the identifier "Val0" included in the first trigger value record 506A each have the integer "0" as the last character of the identifier. Thus, the first trigger instruction address record 502A, the first trigger replacement address record 504A, and the first trigger value record 506A are associated. Therefore, if the replacement generator 110 determines that the first trigger instruction address record 502A corresponds to an instruction identified by the program counter 140 (e.g., the first trigger instruction address included in the first trigger instruction address record 502A matches an address at which the instruction is stored), the replacement generator 110 replaces a value stored at the trigger replacement address with the trigger value. As a result, the replacement generator 110 may replace a value at the first trigger replacement address of 91 (e.g., a value at an address of 91 located in the volatile memory 135) with the first trigger value of 22.

In the example illustrated in FIG. 5, the identifier "TrigM1" included in the second trigger instruction address record 502B, the identifier "Addr1" included in the second trigger replacement address record 504B, and the identifier "Val1" included in the second trigger value record 506B each include the character "1" as the last character of the identifier. Thus, the second trigger instruction address record 502B, the second trigger replacement address record 504B, and the second trigger value record 506B are associated. Similarly, the third trigger instruction address record 502C, the third trigger replacement address record 504C, and the third trigger value record 506C are associated because each identifier included in the records 502C, 504C, 506C include the character "3" as the last character of the identifier. Further, the fourth trigger instruction address record 502D, the fourth trigger replacement address record 504D, and the fourth trigger value record 506D are associated because each identifier included in the records 502D, 504D, 506D include the character "4" as the last character of the identifier.

While in the example of FIG. 5 the trigger instruction address records 502, the trigger replacement address records 504, and the trigger value records 506 are associated using a last character of identifiers included in the records 502, 504, 506, any other methods to associate a trigger instruction address record, a trigger transaction address record, a trigger replacement address record, and/or a trigger value record may additionally or alternatively be used. For example, the first trigger instruction address record 502A, the first trigger replacement address record 504A, and the first trigger value record 506A may each include a shared identifier (such as "IDENTIFIER01") to indicate that the records 502A, 504A, 506A are associated. In another example, the trigger data table 500 may include a data structure such as a trigger record may include the first trigger instruction address record 502A, the first trigger replacement address record 504A, and the first trigger value record 506A. The replacement generator 110 may access the trigger record, and the records 502A, 504A, 506A are associated via the inclusion in the trigger record.

In the illustrated example, each trigger instruction address record is associated with a trigger replacement address record and a trigger value record. For example, the first trigger instruction address record 502A is associated with the first trigger replacement address record 504A and the first trigger value record 506A, and the second trigger instruction address record 502B is associated with the second trigger replacement address record 504B and the second trigger value record 506B. However, any number of triggers can be associated with any number of trigger replacement address records and/or any number of trigger value records. For example, the first trigger instruction address record 502A, the first trigger replacement address record 504A, the second trigger replacement address record 504B, and the third trigger replacement address record 504C may each include a shared identifier of "TRIGGER20". Thus, the first trigger replacement address record 504A, the second trigger replacement address record 504B, and the third trigger replacement address record 504C are associated with the first trigger instruction address record 502A. In another example, a trigger instruction address record may include a pointer to (such as a memory address of) an associated trigger replacement address record and a pointer to an associated trigger value record.

In some examples, the trigger data table 500 may be implemented as one or more eFuses. An eFuse may provide a bit (e.g., a binary digit) of memory. In some examples, eFuses are memory bits that are able to be modified and/or written. In some examples, the replacement generator, and/or more generally, the instruction processor 120, may access the records 502, 504, 506 by accessing one or more eFuses.

FIG. 6 is a flowchart representative of machine-readable instructions which may be executed to implement an example replacement generator (e.g., the replacement generator 110 of FIGS. 1 and/or 4). In some examples, the machine-readable instructions of FIG. 6 may be executed to determine whether to perform a correction and/or perform a correction to replace a value, such as the machine-readable instructions represented by block 320 of FIG. 3. The example of FIG. 6 is further illustrated in FIG. 7. FIG. 7 is an example portion of a code block 700 representative of the machine-readable instructions illustrated in FIG. 6 which may be executed to implement an example replacement generator (e.g., the replacement generator 110 of FIGS. 1 and/or 4). In examples described within, the portion of a code block 700 includes eight example lines 705, 708, 710, 715, 720, 725, 730, 735 of code. However, the portion of the code block 700 may include any number of lines of code. For examples, the portion of the code block 700 may include one hundred lines of code.

The trigger controller 410 accesses a trigger instruction address record. (Block 610, line 705). In examples described herein, the trigger controller 410 accesses the first trigger instruction address record 502A. However, any other trigger instruction address record may additionally and/or alternatively be accessed. For example, the trigger controller 410 may access the third trigger instruction address record 502C.

The trigger comparator 430 accesses the instruction address identified by the program counter 140. (Block 620, line 710). The trigger comparator 430 determines whether a correction should be performed. In examples described herein, the trigger comparator 430 determines whether a correction should be performed by comparing the trigger instruction address to the instruction address identified by the program counter 140. For example, the trigger comparator 430 may compare the first trigger instruction address record 502A to the instruction represented by the third instruction row 220 and determine whether the trigger instruction address of 2 corresponds to the instruction address of 2. However, other methods to compare the trigger instruction address record and the instruction may additionally or alternatively be used. For example, the trigger comparator 430 may compare an instruction value (such as an instruction of 44 represented by the first instruction row 216) to a trigger instruction address (such as the trigger instruction address of 4 of the second trigger instruction address record 502B).

If the trigger comparator 430 determines that the trigger instruction address corresponds to the instruction address (e.g., block 630 returns a result of YES, line 715 returns a result of TRUE), the address accessor 440 accesses a trigger replacement address corresponding to the trigger instruction address record. (Block 640, line 720). A trigger replacement address is included in a trigger replacement address record, and the trigger replacement address record corresponds to a trigger instruction address record using identifiers included in the records. For example, if the trigger instruction address record is the first trigger instruction address record 502A, the address accessor 440 accesses the trigger replacement address of 91 included in the first trigger replacement address record 504A. In another example, if the trigger instruction address record is the second trigger instruction address record 502B, the address accessor 440 accesses the trigger replacement address of 93 included in the second trigger replacement address record 504B.

The value accessor 450 accesses a trigger value corresponding to the trigger instruction address record. (Block 650, line 720). A trigger value is included in a trigger value record, and the trigger value record corresponds to a trigger instruction address record using identifiers included in the records. For example, if the trigger instruction address record is the first trigger instruction address record 502A, the value accessor 450 accesses the trigger value of 22 included in the first trigger value record 506A. In another example, if the trigger instruction address record is the second trigger instruction address record 502B, the value accessor 450 accesses the trigger value of 77 included in the second trigger value record 506B.

The replacement executor 460 replaces (e.g., corrects) a value stored at an address in memory. (Block 660, line 720). The replacement executor 460 replaces a value stored at the trigger replacement address accessed by the address accessor 440 using the trigger value accessed by the value accessor 450. An example memory data table reflecting values corrected by the replacement executor 460 is described below in connection with FIG. 8. In examples described herein, the trigger replacement address is accessed by the address accessor 440, and the trigger value is accessed by the value accessor 450. In some examples, the instruction processor 120 may correct the value stored at the address. In other examples, the replacement executor 460 may provide an interrupt request to a memory replacement system (such as the instruction processor 120 or the execution unit 150) to instruct the memory replacement system to perform the replacement. In some examples, a later instruction identified by the program counter 140 and/or executed by the execution unit 150 accesses the value replaced by the replacement executor 460.

In one example, the trigger controller 410 accesses a set of trigger instruction address records 502. (Block 610). The trigger comparator 430 accesses the instruction address identified by the program counter 140. (Block 620). The trigger comparator 430 may then compare the instruction address to the set of trigger instruction address records 502 to determine if there is a match between the instruction address and any of the trigger instruction address records 502A, 502B, 502C, 502D. If the trigger comparator 430 determines that any of the trigger instruction addresses correspond to the instruction address (e.g., block 630 returns a result of YES), control returns to the address accessor 440 at block 640.

In some examples, the replacement executor 460 may additionally and/or alternatively correct the operation of components (such as peripheral devices, non-memory components, other volatile memory) other than values stored in the volatile memory 135. For example, the replacement executor 460 may identify one or more instructions to be executed by the execution unit 150 or other components to ensure functionality of a device. In some examples, the replacement executor 460 or, more generally, the instruction processor 120, may execute instructions additional and/or alternative to instructions identified by the program counter 140. The instruction processor 120 may execute instructions to replace a value, such as an instruction to provide a transaction indicating a write command to the volatile memory 135.

The trigger controller 410 selects (e.g., accesses) a trigger instruction address record. (Block 670, line 725, line 730). In examples described herein, the trigger controller 410 selects a trigger instruction address record that follows a previously selected trigger. For example, if the selected trigger instruction address record is the first trigger instruction address record 502A, the trigger controller 410 selects the second trigger instruction address record 502B. However, any other methods to select a trigger instruction address record may additionally and/or alternatively be used. For example, a trigger instruction address record may include an identifier such as a pointer to the trigger instruction address record to be selected. After the trigger controller 410 has accessed a trigger instruction address record, control returns to the trigger comparator 430. (Block 620, line 735).

In the example illustrated in FIG. 6, each of the trigger instruction address records are accessed by the replacement generator 110 to determine whether a correction is required either until a trigger instruction address record does not correspond to the instruction address or until each trigger instruction address record has been accessed. However, any number of trigger instruction address records may be accessed by the replacement generator 110. For example, if the first trigger instruction address record 502A corresponds to the current instruction address, the replacement generator 110 may access only the first trigger instruction address record 502A before control returns to the instruction processor 120.

Returning to block 630 (line 715), if the trigger comparator 430 determines that the trigger instruction address record does not correspond to the instruction address (e.g., block 630 returns a result of NO, line 715 returns a result of FALSE), the process completes, and control returns to the execution unit 150. In some examples, multiple trigger instruction address records may be compared to the instruction address identified by the program counter 140. For example, the trigger controller 410 may select a second trigger instruction address record (such as the second trigger instruction address record 502B) and determine whether the second trigger instruction address record corresponds to the instruction address. If the trigger comparator 430 determines that the second trigger instruction address record does not correspond to the instruction address, the trigger controller 410 may then select a third trigger instruction address record (such as the third trigger instruction address record 502C), and the trigger comparator 430 determines whether the third trigger instruction address record corresponds to the instruction address.

Figures 8, 11:
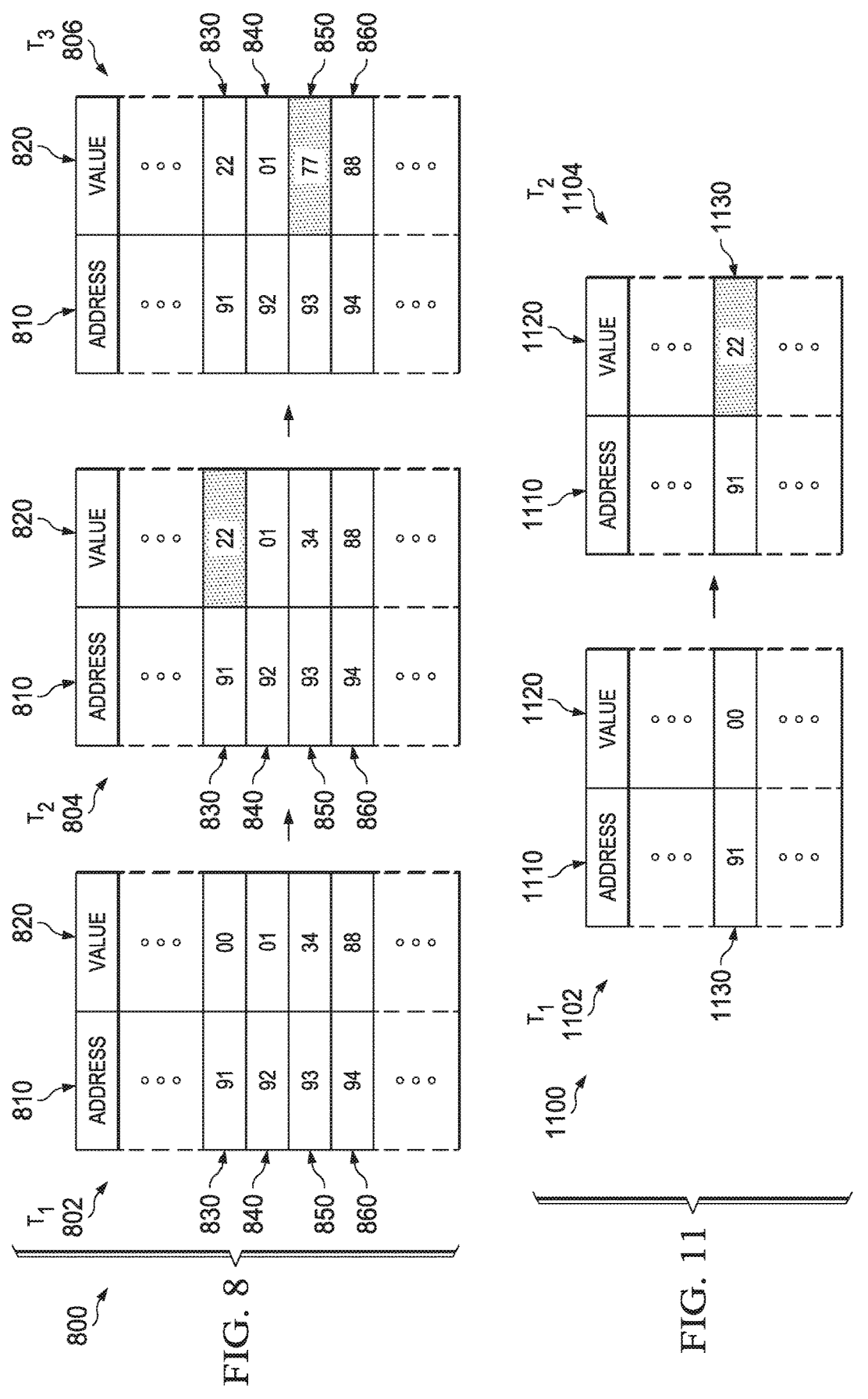

FIG. 8 is an example memory data table 800 representing example values stored at example addresses located in a memory (e.g., the volatile memory 135) to be corrected by an example replacement generator (e.g., the replacement generator 110 of FIGS. 1 and/or 4). The memory data table 800 includes a first example state 802 at time $T_1$, a second example state 804 at time $T_2$, and a third example state 806 at time $T_3$. The memory data table 800 includes example addresses 810 (such as an address to a location in the volatile memory 135) and example values 820 (such as a value stored in the volatile memory 135). The addresses 810 indicate addresses at which the values 820 are stored in a memory (e.g., the volatile memory 135).

In the example illustrated in FIG. 8, the memory data table 800 includes a first memory record 830, a second memory record 840, a third memory record 850, and a fourth memory record 860. The addresses 810 represented in the memory records 830, 840, 850, 860 indicate an address in a memory (e.g., in the volatile memory 135) at which the value represented in a memory record is stored. In the first state 802, the first memory record 830 includes an address of 91 and a value of 0. Thus, in the first state 802, a memory (e.g., the volatile memory 135, a register) includes a value of 0 stored at an address of 91. Further, in the first state 802, the second memory record 840 includes a value of 1 and an address of 92, the third memory record 850 includes a value of 34 and an address of 93, and the fourth memory record 860 includes a value of 88 and an address of 94. Similarly, in the first state 802, the volatile memory 135 includes a value of 1 stored at an address of 92, a value of 34 stored at an address of 93, and a value of 88 stored at an address of 94.

In the second state 804, the replacement generator 110 replaces the value of 0 included in the first memory record 830 with a value of 22. In the example illustrated in FIG. 8, the memory data table 800 represents values stored at addresses in the volatile memory 135. Thus, the replacement generator 110 replaces a value of 0 stored at an address 91, the address indicated in the first memory record 830, with a value of 22 in the volatile memory 135. However, the memory data table 800 may represent any additional and/or alternative memories, peripheral devices communicating with the instruction processor 120, etc. For example, the memory data table 800 may represent values stored at addresses located in a second volatile memory, registers included in the instruction processor 120, etc. In the second state 804, the second memory record 840 with a value of 1 is unchanged, the third memory record 850 with a value of 34 is unchanged, and the fourth memory record 860 with a value of 88 is unchanged relative to the first state 802.

In the third state 806, the replacement generator 110 replaces the value of 34 included in the third memory record 850 with a value of 77. Therefore, the replacement generator 110 replaces a value of 34 stored at an address of 93, the address included in the third memory record 850, with a value of 77 in the volatile memory 135. Further, in the third state 806, the first memory record 830 with a value of 22 is unchanged, the second memory record 840 with a value of 1 is unchanged, and the fourth memory record 860 with a value of 88 is unchanged relative to the second state 804.

While four instruction records are shown in the illustrated example of FIG. 8 to indicate that four values are stored in the volatile memory 135, any other number of values may be included. For example, the volatile memory 135 may store ten thousand values. Thus, the memory data table 800 may include ten thousand memory records. While the addresses 810 and the values 820 are represented as two-digit values in the memory data table 800 illustrated in FIG. 8, the addresses 810 and the values 820 may additionally and/or alternatively include any other form. For example, a value may be represented as a 32-bit integer or a character string.

In the example illustrated in FIG. 8, the memory data table 800 is shown at three states: the first state 802 at time $T_1$, the second state 804 at time $T_2$, and the third state 806 at time $T_3$. While three states are shown in the illustrated example of FIG. 8, the memory data table 800 may have any number of states. For example, if no corrections are performed on the volatile memory 135, the memory data table 800 may include only the first state 802. In another example, if many corrections are performed, the memory data table 800 may include three thousand states.

An extended example of the process illustrated in FIGS. 3 and/or 6 to replace values stored in the volatile memory 135 in connection with instructions represented in the instruction data table 200 and the states 802, 804, 806 of the memory data table 800 is described herein. Control of the process starts with the instruction processor 120, and the program counter 140 determines that the next instruction record to be executed is the instruction of 44 at the address of 0, as represented by the first instruction row 216. (Block 310). Control is given to the replacement generator 110 (block 320), and the trigger controller 410 accesses a trigger instruction address record, the first trigger instruction address record 502A including a trigger instruction address of 2. (Block 610). The trigger comparator 430 accesses the instruction address of 0. (Block 620). The trigger comparator 430 determines that the trigger instruction address of 2 does not correspond to (e.g., match, point to) the instruction address of 0 and therefore determines that a correction should not be performed (e.g., block 630 returns a result of NO). No correction was performed. Thus, no values are updated in the volatile memory 135, and the memory data table 800 remains in the first state 802. Control returns to the instruction processor 120, and the execution unit 150 executes the instruction identified by the program counter 140. (Block 350).

The program counter 140 determines that the instruction record to be executed is the instruction of 55 stored at the address of 1, as represented by the second instruction row 218. (Block 310). Control is given to the replacement generator 110 (block 320), and the trigger controller 410 accesses the current trigger instruction address record, the first trigger instruction address record 502A including a trigger instruction address of 2. (Block 610). The trigger comparator 430 accesses the instruction address 1. (Block 620). The trigger comparator 430 determines that the trigger instruction address of 2 does not correspond to the instruction address of 1 and therefore determines that a correction should not be performed (e.g., block 630 returns a result of NO). No correction was performed. Thus, no values are updated in the volatile memory 135, and the memory data table 800 remains in the first state 802. Control returns to the instruction processor 120, and the execution unit 150 executes the instruction identified by the program counter. (Block 350).

The program counter 140 determines that the instruction record to be executed is the instruction of 55 stored at the address of 2, as represented by the third instruction row 220. (Block 310). Control is given to the replacement generator 110, and the trigger controller 410 accesses the trigger instruction address record, the first trigger instruction address record 502A including a trigger instruction address of 2. (Block 610). The trigger comparator 430 accesses the instruction address of 2. (Block 620). The trigger comparator 430 determines that the trigger instruction address of 2 corresponds to the instruction address of 2 and therefore determines that a correction should be performed (e.g., block 630 returns a result of YES). The address accessor 440 accesses the trigger replacement address corresponding to the trigger instruction address record. (Block 640). The trigger instruction address record is the first trigger instruction address record 502A. Thus, the corresponding trigger replacement address record is the first trigger replacement address record 504A including a trigger replacement address of 91. The value accessor 450 accesses a trigger value corresponding to the trigger instruction address record. (Block 650). The trigger instruction address record, the first trigger instruction address record 502A, corresponds to the first trigger value record 506A. Therefore, the trigger value corresponding to the trigger instruction address record is the trigger value of 22 included in the first trigger value record 506A. The replacement executor 460 corrects a memory value record stored in the volatile memory 135. Because the trigger replacement address is 91, a value stored at the address of 91 in the volatile memory 135 is corrected with the trigger value of 22. (Block 660). Thus, the memory data table 800 transitions from the first state 802 to the second state 804.

The trigger controller 410 selects (e.g., accesses) a trigger instruction address record, the second trigger instruction address record 502B including a trigger instruction address of 4. (Block 670). Control returns to the trigger comparator 430, and the trigger comparator accesses the instruction address of 2. (Block 620). The trigger comparator 430 determines that the trigger instruction address of 4 does not correspond to the instruction address of 2 and therefore determines that a correction should not be performed (e.g., block 630 returns a result of NO). No correction was performed. Thus, no values are updated in the volatile memory 135, and the memory data table 800 remains in the second state 804. Control returns to the instruction processor 120, and the execution unit 150 executes the instruction identified by the program counter 140. (Block 350).

The program counter 140 determines that the instruction record to be executed is the instruction of 55 stored at an address of 3, as represented by the fourth instruction row 230. (Block 310). Control is given to the replacement generator 110 (block 320), and the trigger controller 410 accesses the trigger instruction address record, the second trigger instruction address record 502B including a trigger instruction address of 4. (Block 610). The trigger comparator 430 accesses the instruction address of 3. (Block 620). The trigger comparator 430 determines that the trigger instruction address of 4 does not correspond to the instruction address of 3 and therefore determines that a correction should not be performed (e.g., block 630 returns a result of NO). No correction was performed. Thus, no values are updated in the volatile memory 135, and the memory data table 800 remains in the second state 804. Control returns to the instruction processor 120, and the execution unit 150 executes the instruction identified by the program counter 140. (Block 350).

The program counter 140 determines that the instruction to be executed is the instruction of 80 stored at the address of 4, as represented by the fifth instruction row 240. (Block 310). Control is given to the replacement generator 110, and the trigger controller 410 accesses the trigger instruction address record, the second trigger instruction address record 502B including a trigger instruction address of 4. (Block 610). The trigger comparator 430 accesses the instruction address of 4. (Block 620). The trigger comparator 430 determines that the trigger instruction address of 4 corresponds to the instruction address of 4 and therefore determines that a correction should be performed (e.g., block 630 returns a result of YES). The address accessor 440 accesses the trigger replacement address corresponding to the second trigger instruction address record 502B. (Block 640). The trigger instruction address record is the second trigger instruction address record 502B, and the corresponding trigger replacement address record is the second trigger replacement address record 504B including a trigger replacement address of 93. The value accessor 450 accesses a trigger value included in the second trigger value record 506B corresponding to the second trigger instruction address record 502B. (Block 650). The replacement executor 460 replaces (e.g., corrects) a value stored in the volatile memory 135. Because the trigger replacement address is 93, the value stored in the volatile memory 135 at the address of 93 is corrected with the trigger value of 77. (Block 660). Thus, the memory data table 800 transitions from the second state 804 to the third state 806.

The trigger controller 410 selects (e.g., accesses) a trigger instruction address record, the third trigger instruction address record 502C including a trigger instruction address of 10. (Block 670). Control returns to the trigger comparator 430, and the trigger comparator accesses the instruction address of 4. (Block 620). The trigger comparator 430 determines that the trigger instruction address of 4 does not correspond to the instruction address of 10 and therefore determines that a correction should not be performed (e.g., block 630 returns a result of NO). No correction was performed. Thus, no values in the volatile memory 135 are replaced, and the memory data table 800 remains in the third state 806. Control returns to the instruction processor 120, and the execution unit 150 executes the instruction identified by the program counter 140. (Block 350).

The program counter 140 determines that the instruction to be executed is the instruction of 5 stored at the address of 82, as represented by the sixth instruction row 250. (Block 310). Control is given to the replacement generator 110 (block 320), and the trigger controller 410 accesses the trigger instruction address record, the third trigger instruction address record 502C including a trigger instruction address of 10. (Block 610). The trigger comparator 430 accesses the instruction address of 82. (Block 620). The trigger comparator 430 determines that the trigger instruction address of 10 does not correspond to the instruction address of 5 and therefore determines that a correction should not be performed (e.g., block 630 returns a result of NO). No correction was performed. Thus, no values are updated in the volatile memory 135, and the memory data table 800 remains in the third state 806. Control returns to the instruction processor 120, and the execution unit 150 executes the instruction identified by the program counter 140. (Block 350). In some examples, the process illustrated by FIGS. 3 and/or 6 to modify values stored in the volatile memory 135 may continue with further instructions stored in the non-volatile memory 130.

Figure 9:
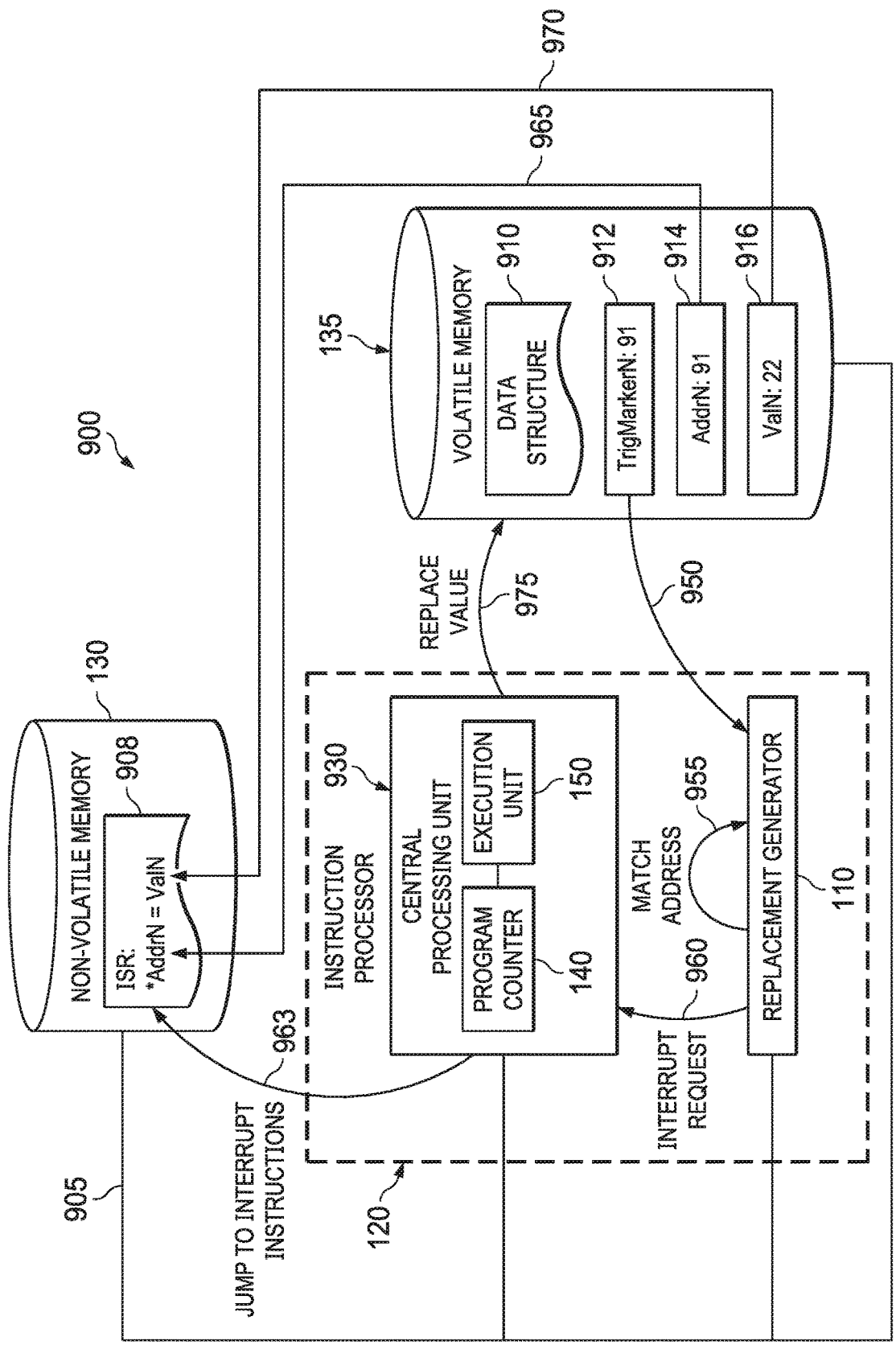
FIG. 9 is a block diagram illustrating an example environment of use including an example replacement generator and example operations performed to replace values in a memory.

FIG. 9 is a block diagram illustrating an example environment 900 of use including an example replacement generator (e.g., the replacement generator 110 of FIGS. 1 and/or 4) and example operations performed to replace values in a memory (e.g., the volatile memory 135). The environment 900 of use of FIG. 9 includes the instruction processor 120, the non-volatile memory 130, the volatile memory 135, and an example interconnect bus 905.

The non-volatile memory 130 includes example replacement instructions 908 that may be identified and executed by the instruction processor 120 to replace values stored in the volatile memory 135. The volatile memory 135 includes an example data structure 910. The instruction processor 120 may replace values stored in the volatile memory 135 that are included in the data structure 910. For example, the data structure 910 may be a linked list including a first value and a second value. During an execution of instructions stored in the non-volatile memory 130, the instruction processor 120 may replace the first value included in the data structure 910 stored in the volatile memory 135, and the instruction processor 120 may then execute an instruction to access the first value and/or the second value from the volatile memory 135.

The volatile memory 135 includes an example trigger transaction address record 912, an example trigger replacement address record 914, and an example trigger value record 916. The trigger transaction address record 912 includes an identifier of "TrigMarkerN" and a trigger transaction address of 91. The trigger replacement address record 914 includes an identifier of "AddrN" and a trigger replacement address of 91. The trigger value record 916 includes an identifier of "ValN" and a trigger value of 22. Each identifier included in the records 912, 914, 916 includes a last character of "N". Thus, the records 912, 914, 916 are associated with each other. In some examples, any of the records 912, 914, 916 may be stored in the local datastore 470 included in the replacement generator 110. In some examples, multiple records may be stored in the local datastore 470 and/or the volatile memory 135. For example, the local datastore 470 may include four trigger transaction address records, four trigger replacement address records, and four trigger value records.

In the example of FIG. 9, the volatile memory 135 includes one trigger transaction address record, one trigger replacement record, and one trigger value record. However, any number of trigger transaction address records, trigger replacement records, and/or trigger value records may be stored in the volatile memory 135 and/or the local datastore 470. For example, a first trigger transaction address record may be stored in the local datastore 470, and a second trigger transaction address record may be stored in the volatile memory 135.

The instruction processor 120 includes the replacement generator 110 and an example central processing unit (CPU) 930. In the example illustrated in FIG. 9, the CPU 930 includes the example program counter 140 of FIG. 1 and the example execution unit 150 of FIG. 1. The CPU 930 identifies an instruction to be executed and executes the identified instruction. In the example of FIG. 9, the CPU 930 accesses a trigger replacement address, accesses a trigger value, and replaces a value stored at the address indicated by the trigger replacement address with the trigger value responsive to an interrupt request provided by the replacement generator 110. The CPU 930 of the illustrated example of FIG. 9 is implemented by a logic circuit such as, for example, a hardware processor. However, any other type of circuitry may additionally or alternatively be used such as, for example, one or more analog or digital circuits, logic circuits, programmable processors, ASICs, PLDs, FPLDs, programmable controllers, GPUs, DSPs, etc.

The replacement generator 110, the non-volatile memory 130, the volatile memory 135, and the CPU 930 communicate via the interconnect bus 905. For example, the CPU 930 accesses data stored in the non-volatile memory 130 (e.g., the replacement instructions 908) via the interconnect bus 905. The CPU 930 accesses and updates values stored in the volatile memory 135 via the interconnect bus 905. Further, the CPU 930 and the replacement generator 110 communicate via the interconnect bus 905. While is one interconnect bus included in the example of FIG. 9, any number of interconnect buses may additionally and/or alternatively be included. For example, the CPU 930 may communicate with the non-volatile memory 130 via a first interconnect bus, and the CPU 930 may communicate with the volatile memory 135 via a second interconnect bus. In the example of FIG. 9, elements in the environment 900 (such as the CPU 930 and the replacement generator 110) are coupled by the interconnect bus 905.

In example illustrated in FIG. 9, the instruction processor 120, volatile memory 135, and non-volatile memory 130 communicate via the interconnect bus 905 using transactions. In examples described herein, a transaction on an interconnect bus includes at least one transaction type (such as a read operation or a write operation) and a transaction address indicating, corresponding to, and/or pointing to, a value stored in a memory. For example, the instruction processor 120 may send a transaction with a transaction type indicating a read command and a transaction address indicating an address of 2 in the volatile memory 135. The volatile memory 135 may respond to the transaction provided by the CPU 930 and/or the instruction processor 120 with a response indicating that a value of 0 is stored at the address of 2. The replacement generator 110 (e.g., the trigger comparator 430) accesses the transaction provided by the instruction processor 120 on the interconnect bus 905 to determine whether a replacement is to be performed. In some examples, the replacement generator 110 is configured to detect the access of an instruction by a processor (such as the instruction processor 120, the CPU 930, the execution unit 150, etc.) by snooping a request for the first transaction (such as a request via a transaction) on a bus that couples the processor to a memory, such as the interconnect bus 905 that couples the CPU 930 to the non-volatile memory 130. The trigger comparator 430 determines whether a trigger transaction address included in a trigger transaction address record corresponds to (e.g., matches, equals) a transaction address included in a transaction.

The execution unit 150 executes an instruction identified by the program counter 140, and the instruction processor 120 provides a transaction on the interconnect bus 905. The transaction includes a transaction type (such as a request to read a value from an address) and a transaction address (such as a pointer to an address of a value to be read). The trigger controller 410 accesses the trigger transaction address record 912. (Operation 950). In examples described herein, a trigger transaction address record matches a transaction address via a trigger transaction address included in the trigger transaction address record. For example, a transaction on the interconnect bus 905 may include a transaction address of 91, and a corresponding trigger transaction address record may include a trigger transaction address of 91.

The trigger comparator 430 accesses the transaction address included in the transaction via the interconnect bus 905 and determines whether a correction should be performed. In the example illustrated by FIG. 9, the trigger comparator 430 determines whether a correction should be performed by comparing the trigger transaction address of 91 included in the trigger transaction address record 912 to the transaction address. (Operation 955). For example, responsive to a detected access of an address via a transaction, the trigger comparator 430 may compare the trigger transaction address record 912 including a trigger transaction address of 91 to a transaction including a transaction address of 41. Because the trigger transaction address of 91 does not match the transaction address of 41, the trigger comparator 430 may therefore determine that a correction should not be performed. In another example, the trigger comparator 430 may compare, or match, the trigger transaction address of 91 to a transaction including a transaction address of 91, and the trigger comparator 430 may therefore determine that a correction should be performed. However, any other methods to compare the trigger transaction address record 912 to a transaction may additionally and/or alternatively be used. For example, the trigger comparator 430 may determine whether a transaction type (such as a read or write command) included in the transaction corresponds to, or matches, a trigger transaction type included in the trigger transaction address record 912.

If the trigger comparator 430 determines that the trigger transaction address corresponds to (e.g., matches, equals) the transaction address, the replacement generator 110 provides an interrupt request to a memory replacement system, such as the CPU 930, the instruction processor 120, and/or the execution unit 150. In the example illustrated in FIG. 9, the replacement generator 110 provides the interrupt request to the CPU 930. (Operation 960). The replacement generator 110 may send an interrupt request to the instruction processor 120 via the interconnect bus 905 such that the CPU 930 may replace a value located in the volatile memory 135 prior to an execution of an instruction identified by the program counter 140.

In the example illustrated in FIG. 9, the non-volatile memory 130 includes replacement instructions 908 that are identified and executed by the CPU 930 to replace a value in the volatile memory 135 responsive to an interrupt request provided by the replacement generator 110. (Operation 963). In other examples, the program counter 140 may transmit a transaction on the interconnect bus 905 to access a value stored in the volatile memory 135, await a response from the replacement generator 110 (e.g., await a replacement of a value by the replacement generator 110), and then access the response from the volatile memory 135 on the interconnect bus 905 for a later execution of instructions to process the value.

The instruction processor 120 (e.g., the CPU 930, the address accessor 440) accesses a trigger replacement address corresponding to the trigger transaction address record. (Operation 965). For example, if the trigger transaction address record is the trigger transaction address record 912, the corresponding trigger replacement address record is the trigger replacement address record 914 because identifiers included in each record include a last character of "N". As a result, the address accessor 440 accesses the trigger replacement address of 91 included in the trigger replacement address record 914.

The instruction processor 120 (e.g., the CPU 930, the value accessor 450) accesses a trigger value corresponding to the trigger transaction address record 912. (Operation 970). For example, if the trigger transaction address record is trigger transaction address record 912, the corresponding trigger value record is the trigger value record 916 because identifiers included in each record include a last character of "N". As a result, the value accessor 450 accesses the trigger value of 22 included in the trigger value record 916.

The CPU 930 replaces (e.g., corrects) a value stored at an address in memory. (Operation 975). The trigger replacement address record 914 and the trigger value record 916 are each accessed by the CPU 930. In some examples, the trigger replacement address record 914 is accessed by the address accessor 440, and the trigger value record 916 is accessed by the value accessor 450. In some examples, the instruction processor 120 may correct a value stored at an address in a memory. In some examples, the replacement executor 460 corrects a value at an address of 91 in the volatile memory 135 pointed to by the trigger replacement address record 914 with the trigger value of 22 included in the trigger value record 916. An example memory data table reflecting values stored in the volatile memory 135 and corrected by the instruction processor 120 is described below in connection with FIG. 11.

If the replacement generator 110 (e.g., the trigger comparator 430) determines that the trigger transaction address record 912 does not correspond to the transaction address included in a transaction, the identification and execution of instructions by the CPU 930 may continue via the program counter 140 and the execution unit 150. Further transactions may be provided by the CPU 930 to be accessed by the replacement generator 110.

Figure 10:
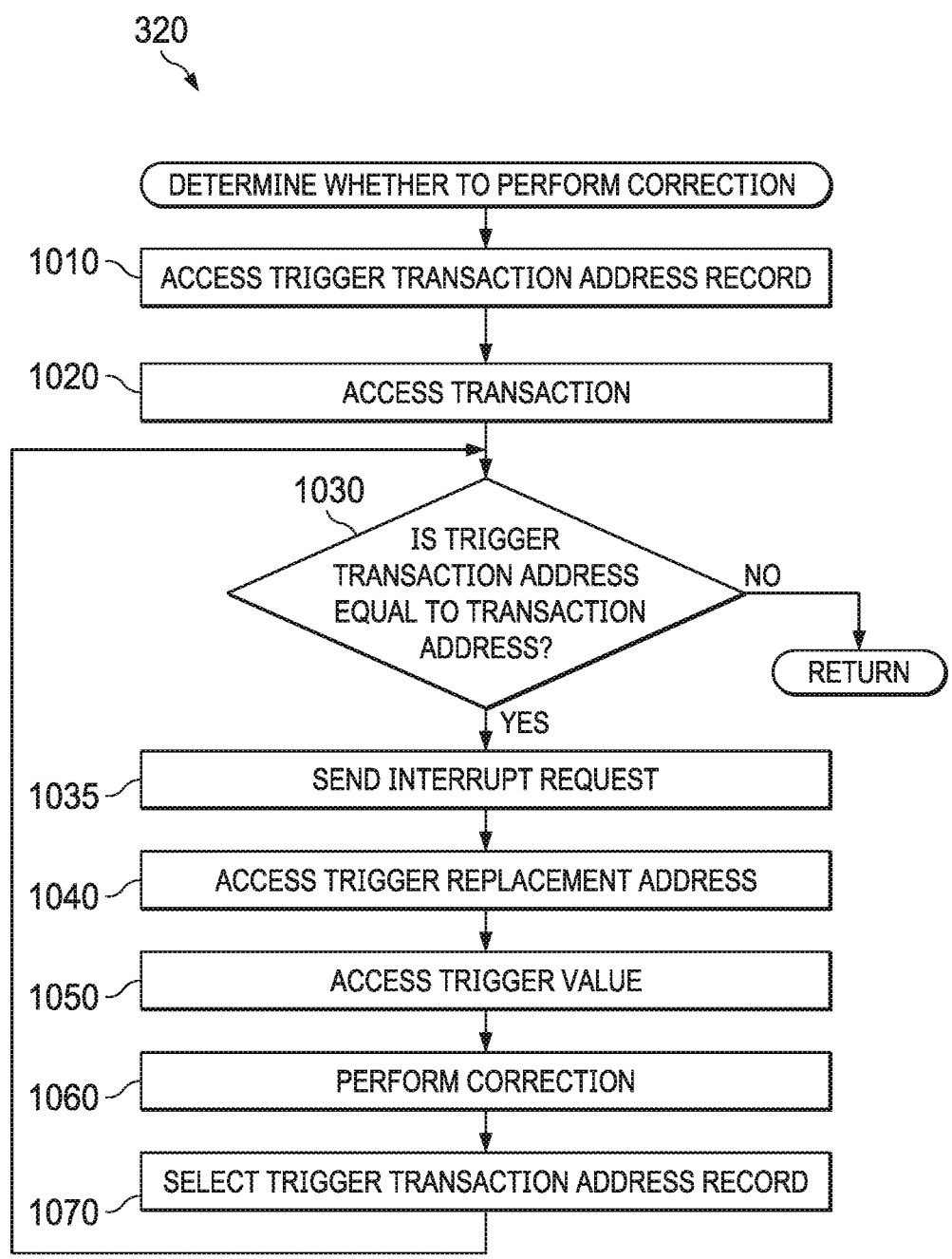
FIG. 10 is a flowchart representative of machine-readable instructions which may be executed to implement an example replacement generator.

FIG. 10 is a flowchart representative of machine-readable instructions which may be executed to implement an example replacement generator (e.g., the replacement generator 110 of FIGS. 1, 4, and/or 9). The trigger controller 410 accesses the trigger transaction address record 912. (Block 1010). In the example illustrated in FIG. 10, a trigger transaction address record is associated with a transaction address by matching the trigger transaction address to the transaction address. For example, the trigger transaction address record 912 may include a trigger transaction address of 91 corresponding to a transaction on the interconnect bus 905 including a transaction address of 91.

The trigger comparator 430 accesses the transaction address included in the transaction on the interconnect bus 905 and determines whether a correction should be performed. (Block 1020). In examples described within, the trigger comparator 430 determines whether a correction should be performed by matching the trigger transaction address included in a trigger transaction address record to the transaction address. For example, the trigger comparator 430 may compare the trigger transaction address record 912 including a trigger transaction address of 91 to a transaction including a transaction address of 91. However, any other methods to compare the trigger transaction address record to a transaction may additionally and/or alternatively be used. For example, the trigger comparator 430 may determine whether a transaction type (such as a read or write command) included in the transaction matches a trigger transaction type included in the trigger transaction address record 912.

If the trigger comparator 430 determines that the trigger transaction address corresponds to (e.g., matches, equals) the transaction address (e.g., block 1030 returns a result of YES), the replacement generator 110 provides an interrupt request to a memory replacement system, such as CPU 930. (Block 1035). In the example illustrated in FIGS. 9 and/or 10, the replacement generator 110 is executing in parallel with CPU 930, the program counter 140, and the execution unit 150. Therefore, the replacement generator 110 may provide an interrupt request to the instruction processor 120 via the interconnect bus 905 for the instruction processor 120 (e.g., the CPU 930) to correct a value prior to an execution of an instruction to access the corrected value.

The instruction processor (e.g., the CPU 930, the address accessor 440) accesses a trigger replacement address corresponding to the trigger transaction address record 912. (Block 1040). The trigger replacement address is included in a trigger replacement address record (e.g., the trigger replacement address record 914), and the trigger replacement address corresponds to the trigger transaction address record via an identifier included in each record (e.g., the records 912, 914). For example, if the trigger transaction address record is the trigger transaction address record 912, the address accessor 440 accesses the trigger replacement address of 91 included in the trigger replacement address record 914.

The instruction processor (e.g., the CPU 930, the value accessor 450) accesses a trigger value corresponding to the trigger transaction address record 912. (Block 1050). The trigger value is included in a trigger value record, such as the trigger value record 916, and the trigger replacement address corresponds to the trigger transaction address record 912 via an identifier included in the trigger value record 916 and the trigger transaction address record 912. For example, if the trigger transaction address record is the trigger transaction address record 912, the value accessor 450 accesses the trigger value of 22 included in the trigger value record 916.

The instruction processor (e.g., the CPU 930, the replacement executor 460) corrects a value stored at an address in memory. (Block 1060). The CPU 930 and/or the replacement executor 460 replaces a value stored at an address pointed to by the trigger replacement address with the trigger value included in the trigger value record 916. In some examples, the CPU 930 accesses the trigger replacement address included in the trigger replacement address record 914 and the trigger value included in the trigger value record 916. In some examples, the trigger replacement address is accessed by the address accessor 440, and the trigger value is accessed by the value accessor 450. In some examples, the CPU 930 may correct the value stored at the address in the volatile memory 135 with the trigger value. For example, the replacement executor 460 may provide an interrupt request to a memory replacement system (such as the instruction processor 120, the CPU 930, the program counter 140, and/or the execution unit 150) to instruct the memory replacement system to perform the replacement. In some examples, an instruction identified by the program counter 140 and/or executed by the execution unit 150 accesses the value replaced by the instruction processor 120, the replacement executor 460, and/or the CPU 930.

The trigger controller 410 selects (e.g., accesses) a trigger transaction address record. (Block 1070). In some examples, the trigger controller 410 selects a trigger transaction address record based on an identifier included in the previous trigger transaction address record. For example, if a previous trigger transaction address record includes an identifier of "0", the trigger controller 410 may select a trigger transaction address record that includes an identifier of "1". However, any other methods to select a trigger transaction address record may additionally and/or alternatively be used. After the trigger controller 410 has selected a trigger transaction address record, control returns to the trigger comparator 430 at block 1030.

Returning to block 1030, if the trigger comparator 430 determines that the trigger transaction address record does not correspond to the transaction address included in the transaction (e.g., block 1030 returns a result of NO), control returns to the CPU 930. In some examples, multiple trigger transaction address records may be compared to the transaction address. For example, the trigger controller 410 may select a second trigger transaction address record and determine whether the second trigger transaction address record corresponds to the transaction address. If the trigger comparator 430 determines that the second trigger transaction address record does not correspond to the transaction address, the trigger controller 410 may then select a third trigger transaction address record, and the trigger comparator 430 determines whether the third trigger transaction address record corresponds to the transaction address included in the transaction.

FIG. 11 is an example memory data table 1100 representing example values stored at example addresses located in a memory (e.g., the volatile memory 135) to be corrected by an example replacement generator (e.g., the replacement generator 110 of FIGS. 1, 4, and/or 9). The memory data table 1100 includes a first example state 1102 at time $T_1$ and a second example state 1104 at time $T_2$. The memory data table 1100 includes an example address 1110 (such as an address to a location in the volatile memory 135) and an example value 1120 (such as a value stored in the volatile memory 135 at the address 1110). The address 1110 indicates the address at which the value 1120 is stored in a memory (e.g., the volatile memory 135).

In the example illustrated in FIG. 11, the memory data table 1100 includes a memory row 1130. In the first state 1102, the memory row 1130 includes an address of 91 and a value of 0. In other words, in the first state 1102, a memory (e.g., the volatile memory 135) includes a value of 0 stored at an address of 91. In the second state 1104, the replacement generator 110 replaces the value of 0 located at an address of 91 in the volatile memory with a value of 22, as represented by the memory row 1130. In the example illustrated in FIG. 11, the memory data table 1100 represents values stored at addresses in the volatile memory 135. Thus, the replacement generator 110 replaces a value of 0 stored at an address of 91, the address indicated in the memory row 1130, with a value of 22 in the volatile memory 135. However, the memory data table 1100 may represent any additional and/or alternative memories, peripheral devices communicating with the instruction processor 120, etc. For example, the memory data table 1100 may represent values stored by another device communicating with the instruction processor 120 via the interconnect bus 905.

While one memory row is shown in the illustrated example of FIG. 11 to indicate that one value is stored in the volatile memory 135, any other number of values may be included. For example, the volatile memory 135 may store ten thousand values. Thus, the memory data table 1100 may include ten thousand memory records. While the address 1110 and the value 1120 are represented as two-digit values in the memory data table 1100 illustrated in FIG. 11, the address 1110 and the value 1120 may additionally and/or alternatively include any other form. For example, the value 1120 may be represented as a character string or two 64-bit integers.

In the example illustrated in FIG. 11, the memory data table 1100 is shown at the first state 1102 at time $T_1$ and the second state 1104 at time $T_2$. While two states are shown in the illustrated example of FIG. 11, the memory data table 1100 may have any number of states. For example, if no corrections are performed on values stored in the volatile memory 135, the memory data table 1100 may include only the first state 1102. In another example, if many values are corrected in the volatile memory 135, the memory data table 1100 may include three thousand states. In the first state 1102, the memory row 1130 in the memory data table 1100 at the first state 1102 includes the value 1120 in an initial state.

An extended example of the process illustrated in FIGS. 3 and/or 10 to correct values in the volatile memory 135 in connection with the states 1102, 1104 of the memory data table 1100 is described herein. Control of the process starts with the CPU 930, and the execution unit 150 provides a transaction on the interconnect bus 905 to request a value stored in the volatile memory 135. (Block 350). The transaction includes a transaction type indicating a read command and a transaction address of 91. Thus, the execution unit 150, and/or more generally the CPU 930, requests the volatile memory 135 to provide a value stored at the address of 91 located in the volatile memory 135. The program counter 140 identifies an instruction to execute. (Block 310). The instruction may obtain the value at the address of 91 provided by the volatile memory 135 on the interconnect bus 905. Thus, after a correction of the value stored at the address of 91, the instruction may be executed by the execution unit 150, and the instruction may access the corrected value.

The trigger controller 410 accesses the trigger transaction address record 912 which includes a trigger transaction address of 91. (Block 1010). The trigger comparator 430 accesses the transaction provided by the CPU 930, the transaction including the transaction type indicating a read command and the transaction address of 91. (Block 1020). The trigger comparator 430 determines that the trigger transaction address of 91 corresponds to (e.g., matches, equals, points to) the transaction address of 91 and therefore determines that a correction should be performed (e.g., block 1030 returns a result of YES).

The replacement generator 110 provides an interrupt request to the instruction processor 120 via the interconnect bus 905. (Block 1035). The CPU 930 (e.g., the execution unit 150) accesses the trigger replacement address of 91 included in the trigger replacement address record 914 corresponding to the trigger transaction address record 912. (Block 1040). As mentioned above, the trigger replacement address record 914 and the trigger value record 916 correspond to the trigger transaction address record 912 via identifiers included in the records 912, 914, 916. The CPU 930 (e.g., the execution unit 150) accesses the trigger value of 22 included in the trigger value record 916 corresponding to the trigger transaction address record 912. (Block 1050). The CPU 930 replaces the value located at the address of 91 in the volatile memory 135 (e.g., the address pointed to by the trigger transaction address), as shown in the memory data table 1100 at the second state 1104. (Block 1060).

Because the trigger replacement address is 91, the value located at the address of 91 in the volatile memory 135 is replaced with the trigger value of 22. As a result, the memory data table 1100 representing values stored in the volatile memory 135 transitions from the first state 1102 to the second state 1104. In the second state 1104, the value 1120 included in the memory row 1130 is corrected with the trigger value of 22. The trigger comparator 430 selects (e.g., accesses) a trigger transaction address record. (Block 1070). The extended example concludes. In some examples, the process illustrated by FIGS. 10 and/or 11 to modify values stored in the volatile memory 135 may continue with further transactions provided on the interconnect bus 905. For example, after a correction has been executed, the execution unit 150 may execute one or more instructions to provide a second transaction on the interconnect bus 905 to access the updated value stored at the address of 91 in the volatile memory 135.

Figure 12:
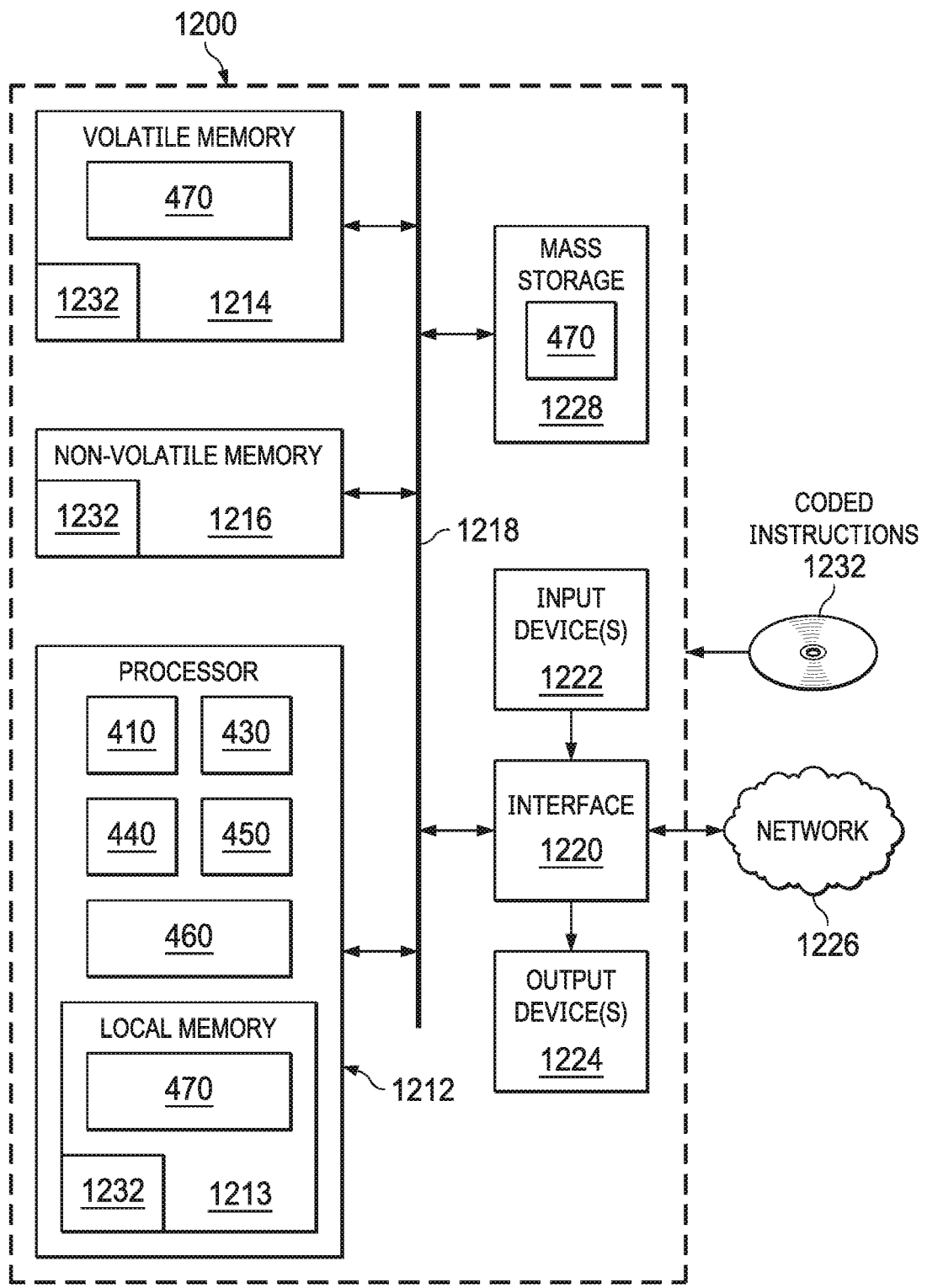
FIG. 12 is a block diagram of an example processor platform structured to execute the instructions of FIGS. 3, 6, and/or 10 to implement an example replacement generator.

FIG. 12 is a block diagram of an example processor platform 1200 structured to execute the instructions of FIGS. 3, 6, and/or 10 to implement the replacement generator 110 of FIGS. 1, 4, and/or 9. The processor platform 1200 can be, for example, a server, a personal computer, a workstation, a mobile device (e.g., a cell phone, a smart phone, a tablet such as an iPad™), a personal digital assistant (PDA), an Internet appliance, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the trigger controller 410, the trigger comparator 430, the address accessor 440, the value accessor 450, and the replacement executor 460.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input devices 1222 permit a user to enter data and/or commands into the processor 1212. The input devices can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 3, 6, and/or 10 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that correct values in a device. The disclosed methods, apparatus and articles of manufacture improve the efficiency of using a computing device by correcting a bootloader process for a device without the modification of bootloader instructions stored in non-volatile memory. The disclosed methods, apparatus and articles of manufacture are accordingly directed to one or more improvements in the functioning of a computer.

Example methods, apparatus, and systems to replace values in a device are disclosed herein. Further examples and combinations thereof include the following:

Example 1 includes an apparatus comprising a processor and a replacement generator coupled to the processor and configured to detect an access, by the processor, of a first instruction at a first address in a first memory, in response to the detected access, compare the first address to a set of trigger instruction address records in a second memory, wherein the set of trigger instruction address records includes a first trigger instruction address record that is associated with a first replacement address record and a first replacement value record, and based on the first address corresponding to the first trigger instruction address record, replace a first value at a second address in a third memory specified by the first replacement address record with a second value specified by the first replacement value record.

Example 2 includes the apparatus of example 1, wherein the first memory is a read-only memory.

Example 3 includes the apparatus of example 1, wherein the replacement generator is configured to detect the access by snooping a request for the first instruction on a bus that couples the processor to the first memory.

Example 4 includes the apparatus of example 1, wherein the replacement generator is configured to replace the first value at the second address by issuing an interrupt to the processor configured to cause the processor to store the second value at the second address.

Example 5 includes the apparatus of example 1, wherein the third memory is a register of the processor.

Example 6 includes the apparatus of example 1, wherein the replacement generator is to access the second value by accessing an eFuse.

Example 7 includes the apparatus of example 1, wherein the first address is a transaction address included in a transaction on an interconnect bus.

Example 8 includes a system comprising a program counter to identify a first instruction to be executed, the first instruction located in a non-volatile memory at a first address, a replacement generator to determine whether a second address corresponds to the first address, the second address corresponding to a trigger instruction address record, access a third address corresponding to the trigger instruction address record and to a location of a first value, access a second value corresponding to the trigger instruction address record, and replace the first value at the third address with the second value, and an execution unit to execute a second instruction to access the second value.

Example 9 includes the system of example 8, wherein the location of the first value is in a first memory and the second value accessed by the replacement generator is located in a second memory different than the first memory.

Example 10 includes the system of example 8, wherein the replacement generator is to replace the first value by providing an interrupt request to the execution unit.

Example 11 includes the system of example 8, wherein the replacement generator is to access the second value including accessing an eFuse.

Example 12 includes the system of example 8, wherein the first address is a transaction address included in a transaction on an interconnect bus.

Example 13 includes the system of example 8, wherein the replacement generator is to access a trigger instruction address record including the second address.

Example 14 includes a method comprising accessing a first address corresponding to a first location in a non-volatile memory, determining whether a second address corresponds to the first address, the second address corresponding to a trigger instruction address record, accessing a third address corresponding to the trigger instruction address record and to a location of a first value, accessing a second value corresponding to the trigger instruction address record, the second value different than the first value, and replacing the first value at the third address with the second value, the second value to be accessed by an instruction.

Example 15 includes the method of example 14, wherein the location of the first value is in a first memory and the second value prior to the replacing is located in a second memory different than the first memory.

Example 16 includes the method of example 14, wherein the replacing the first value includes providing an interrupt request to a memory replacement system.

Example 17 includes the method of example 14, wherein the first address is an instruction address identified by a program counter.

Example 18 includes the method of example 14, wherein the first address is a transaction address included in a transaction on an interconnect bus.

Example 19 includes the method of example 14, wherein the second address corresponds to a location of an instruction in the non-volatile memory to be executed.

Example 20 includes the method of example 14 including accessing a trigger instruction address record including a second address.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a trigger comparator configured to receive an instruction address and perform a comparison of the instruction address to a trigger instruction address of a trigger instruction address record;
   an address accessor coupled to the trigger comparator configured to access a trigger replacement address corresponding to the trigger instruction address record in response to the comparison determining a correspondence between the instruction address and the trigger instruction address; and
   a replacement executor coupled to the address accessor, the replacement executor configured to replace a first value associated with the instruction address with a second value associated with the trigger replacement address.

2. The apparatus of claim 1, further includes:
a trigger controller coupled to the trigger comparator, the trigger controller configured to retrieve the trigger instruction address record.

3. The apparatus of claim 1, further includes:
a value accessor coupled to the replacement executor and configured to retrieve the second value associated with the trigger replacement address from a memory.

4. The apparatus of claim 1, wherein:
the instruction address is a transaction address;
the trigger instruction address is a trigger transaction address;
the trigger instruction address record is a trigger transaction address record; and
the trigger replacement address is a trigger transaction.

5. The apparatus of claim 4, further comprising:
a local memory coupled to the trigger comparator, the address accessor, and the replacement executor, the local memory configured to store the trigger instruction address record, the second value, the trigger replacement address, and the trigger transaction address record.

6. The apparatus of claim 1, wherein:
the replacement executor is configured to replace the first value by issuing an interrupt.

7. A system comprising:
a volatile memory;
a non-volatile memory; and
a processor coupled to the non-volatile memory, the processor configured to:
identify a first instruction to be executed, the first instruction located in the non-volatile memory at a first address;
access a set of trigger instruction address records to retrieve a trigger instruction address record corresponding to the first instruction;
compare the first address with a second address of the trigger instruction address record; and
in response to the second address of the trigger instruction address record corresponding to the first address, replace a first value associated with the first instruction with a second value associated with the second address.

8. The system of claim 7, wherein:
the first value is stored the volatile memory;
the second value is stored in a memory different than the volatile memory and the non-volatile memory.

9. The system of claim 7, wherein:
the first instruction is a transaction.

10. The system of claim 9, wherein:
the transaction occurs on an interconnect bus coupled to the processor.

11. The system of claim 9, wherein:
the transaction includes a transaction type and a transaction address.

12. The system of claim 11, wherein:
the transaction type includes one of a read command and a write command.

13. The system of claim 11, wherein:
the transaction address is located in the volatile memory.

14. A method comprising:
accessing, by a processor, a first address corresponding to a first location in a first memory, the first address associated with a first value;
comparing, by a trigger comparator, the first address with a second address; and
in response to the first address corresponding with the second address, replacing, by a replacement executor, the first value with a second value associated with the second address.

15. The method of claim 14, wherein:
the second value is stored in a second memory different than the first memory.

16. The method of claim 14, wherein:
the replacing the first value includes providing an interrupt request to a memory replacement system.

17. The method of claim 14, wherein:
the first address is a transaction address; and
the second address is a trigger transaction address.

18. The method of claim 17, wherein:
the transaction address is included in a transaction on an interconnect bus.

19. The method of claim 14, wherein:
the second value is a pointer to a volatile memory.

20. The method of claim 14, further comprising:
accessing, by a trigger controller, trigger instruction address records to determine the second address.

* * * * *